(12) United States Patent
Nakayasu et al.

(10) Patent No.: US 6,292,205 B1
(45) Date of Patent: Sep. 18, 2001

(54) ELECTROPHOTOGRAPHIC APPARATUS WITH QUANTITY-OF-LIGHT CONTROL

(75) Inventors: Hirofumi Nakayasu; Youji Houki; Yoshihiko Taira; Kouichi Kobayashi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/342,053

(22) Filed: Jun. 29, 1999

(30) Foreign Application Priority Data

Jan. 8, 1999 (JP) .................................................. 11-002620

(51) Int. Cl.$^7$ .................................................. G03G 13/04
(52) U.S. Cl. ............................ 347/131; 358/1.9; 358/300
(58) Field of Search ................................. 347/131, 132; 358/459, 298, 1.9, 1.7, 300, 458; 399/180, 181

(56) References Cited

U.S. PATENT DOCUMENTS

| 4,768,043 | * | 8/1988 | Saito et al. ........................ 347/252 |
| 5,210,545 | * | 5/1993 | Tomita .............................. 347/254 |
| 5,233,370 | | 8/1993 | Hara et al. . |
| 5,493,324 | | 2/1996 | Goto et al. . |
| 5,774,167 | * | 6/1998 | Hara ............................... 347/131 X |

FOREIGN PATENT DOCUMENTS

| S57-060355 | 4/1982 | (JP) . |
| S60-139072 | 7/1985 | (JP) . |
| H02-007668 | 1/1990 | (JP) . |
| H05-042717 | 2/1993 | (JP) . |
| H06-022090 | 1/1994 | (JP) . |
| H06-040071 | 2/1994 | (JP) . |
| H07-250240 | 9/1995 | (JP) . |
| H07-250246 | 9/1995 | (JP) . |

* cited by examiner

Primary Examiner—David F. Yockey
(74) Attorney, Agent, or Firm—Armstrong, Westerman, Hattori, McLeland & Naughton, LLP

(57) ABSTRACT

Electrostatic developing units are arranged in the record paper conveyance direction, form dot latent images in conformity with image dot data through the issue of scanning light on photosensitive drums in rotation, and after developing by toner components, transfer dots onto record paper for development. For each lighting noticeable dot amount image dot data, a quantity-of-light control unit provides control and output of optical energy of the noticeable dot on the basis of peripheral dots which may have influence on the size of the noticeable dot on the record paper, for example, in response to the distance from the peripheral dots.

13 Claims, 22 Drawing Sheets

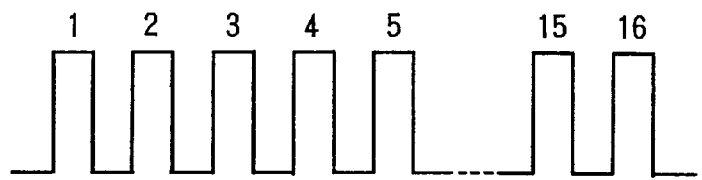
FIG. 16A
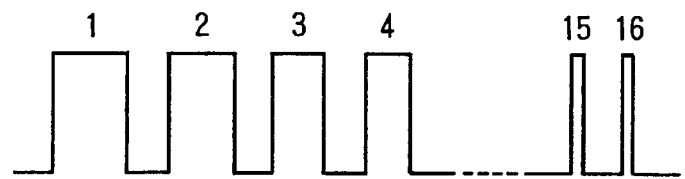
FIG. 16B
FIG. 17
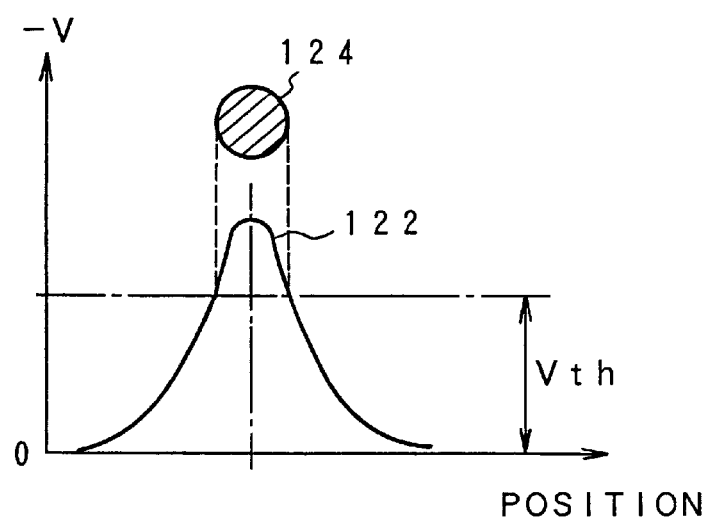

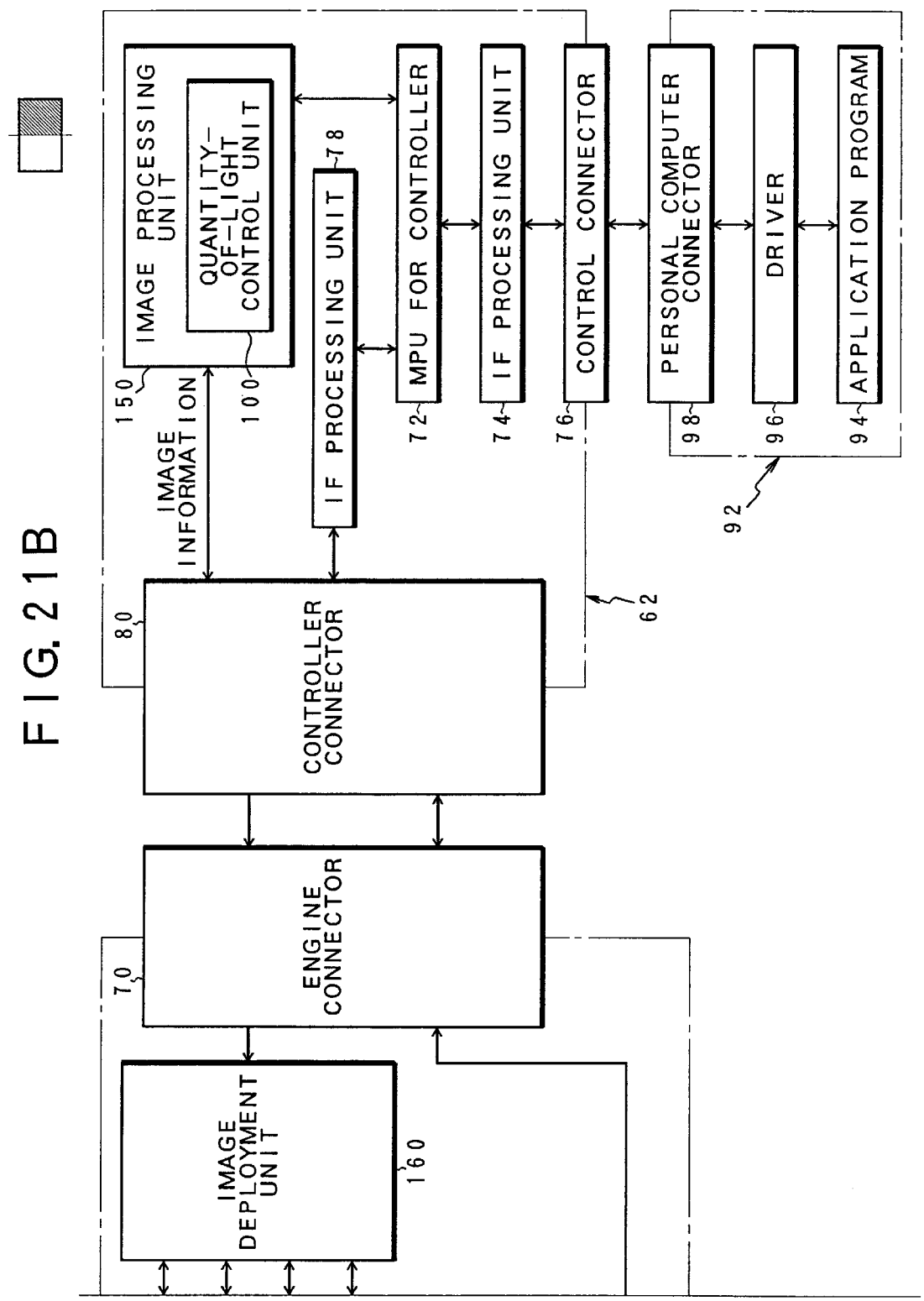

ELECTROPHOTOGRAPHIC APPARATUS WITH QUANTITY-OF-LIGHT CONTROL

BACKGROUND OF THE INVENTION

1. Field of the Invention

The present invention relates generally to an electrophotographic apparatus and method for use in a printer, a facsimile, etc., in which dot latent images in conformity with binarized image dot data are formed on a photosensitive drum through scanning of an LED array or a laser beam and in which after development of the latent images with toners the resultant dots are transferred onto record paper, and more particularly to an electrophotographic apparatus and method providing control of appropriate quantity of light emission taking into consideration the influence of light from lighting peripheral dots.

2. Description of the Related Arts

In the case of conventional electrophotographic apparatuses used for image printing in laser printers, facsimiles or the like, record paper is conveyed at a certain speed by a paper conveyance mechanism so that images are recorded on the record paper through the electrophotographic process executed by electrostatic recording units arranged in the record paper conveyance direction. The electrostatic recording unit forms latent images in conformity with image dot data by means of LED array line scanning or laser diode laser beam scanning on a photosensitive drum in rotation, and after development with toner components, transfers the developed images onto record paper. In recent years, color electrophotographic apparatuses for recording color images have also been put into practice. The color electrophotographic apparatus comprises four electrostatic recording units of black (K), cyan (C), magenta (M) and yellow (Y) in a tandem manner in the record paper conveyance direction. The electrostatic recording units for four colors optically scan the photosensitive drums on the basis of image data to form latent images, develop the latent images with color toners in developing vessels, transfer the developed images onto record paper being conveyed at a certain speed in a superposed manner in the order of yellow (Y), magenta (M), cyan (C) and black (K), and finally perform thermal fixing through a fixing device or other processes.

However, such conventional electrophotographic apparatuses have entailed the following problems since the LED array or the laser diode issues a uniform optical energy per dot to perform development and recording. Now assume that the optical energy has been determined so as to be able to develop isolated one dot on white background. FIG. 1 shows a relationship between a latent image and a bias voltage in the case where the photosensitive drum has been subjected to optical energy capable of developing an isolated one dot in the electrophotographic process. A latent image 200 is not developed as a toner image at a specific bias voltage Vth or below, but it is developed as a toner image 202 at a voltage exceeding the bias voltage Vth, with the dot size of W1. However, in the case where the optical energy equal to FIG. 1 is supplied to the adjoining two dot positions to develop two dot lines as shown in FIG. 2, latent images 204 and 206 indicated by broken lines are formed for respective dots, resulting in a combined latent image 208 indicated by solid line in its entirety, whereupon a toner image 210 is developed for broken line latent images exceeding the bias voltage Vth. Such a combination of the optical energy supplied to the adjoining dots leads to the dot size W2 exceeding the original two dots. Alternatively, in cases where the optical energy equal to FIG. 1 has been supplied to two dots with one dot space as shown in FIG. 3, combination of latent images 212 and 214 indicated by broken lines result in a latent image 216 indicated by a solid line, whereupon a toner image 218 comes to have three dot size W3 with the crushed intermediate dot. In case of presence of another dot around the lighting dots in this manner, mutual influence will cause a crush of the isolated white point when the high-density pattern is printed, with another problem in that halftone pattern of the order of 50% will bring about saturation of density, leading to the density of solid print area.

On the contrary, if the optical energy per dot is determined as shown in FIG. 4 so as to prevent the density of the high-density part from saturating, the latent image 220 may not reach the bias voltage Vth due to too small optical energy when the one dot isolated point is printed, which makes it impossible to develop the dots. For this reason, respective drawbacks lie in both the method of determining the optical energy so as to enable isolated one dot to be developed and the method of determining the optical energy so as to prevent the density of a high-density part from saturating, with the mutual trade-off relationship. Therefore, in reality, intermediate value of the two methods is employed with respective some problems unsolved.

Further, the drawbacks that the emission of light of a plurality of adjoining dots may cause too a large dot size and that no isolated dot may be formed by the high-density optical energy, will be attributable to the non-linear relationship as shown in FIG. 5, in which the relation between the developed dot diameter and the optical energy is not linear. That is, the dots are not formed with an optical energy L short of a certain threshold value Lth. Once the optical energy exceeds the threshold value Lth, the dot diameter W sharply increases in accordance with the increase of the optical energy P. Afterwards, increase of the dot diameter W become gradually gentle with respect to the increase of the optical energy P.

SUMMARY OF THE INVENTION

According to the present invention, there is provided an electrophotographic apparatus and method capable of faithfully developing and recording dots irrespective of dot patterns, by appropriately controlling optical energy for light-emission taking into consideration the fact that optical energies mutually influence each other between adjacent dots.

The electrophotographic apparatus of the present invention comprises an electrostatic recording unit and a quantity-of-light control unit. The electrostatic recording unit forms a dot latent image in conformity with binarized image dot data through lighting of a scanning light on a latent image carrier in motion, e.g., a rotating photosensitive drum arranged in the record paper conveyance direction, and after development with a toner component, transfers dots onto record paper for development. The quantity-of-light control unit provides, for each lighting noticeable dot among the image dot data, a control of optical energy for use in formation of a latent image of the noticeable dot, on the basis of peripheral dots which may have influence on the size of the noticeable dot on the record paper. According to such an electrophotographic apparatus of the present invention, interpolation is made of non-linear characteristic upon the conversion of the optical energy into dot diameters in the electrophotographic process, thereby achieving a reproduction faithful to the image dot data. Further, there is no need for a technique such as edge recognition for dot pattern smoothing processing and the like, and letters, diagrams, images and their mixtures can faithfully be reproduced. For example, in the case of one dot isolated point, a developed dot of a normal size is obtained from the latent image. In the case of two dot lines, the optical energy is reduced in view of the mutual influence as in the latent image indicated broken line. Then from the combined latent image there is accurately obtained a developed dot having a dot size substantially double the size of one dot.

The quantity-of-light control unit provides a control of optical energy of the noticeable dot in response to the distance from the peripheral dots. For example, as shown by the optical energy arithmetic matrix, the quantity-of-light control unit defines, as a reference value, e.g., reference value 100% of optical energy of the noticeable dot, optical energy required for formation of a solid part of the record paper on which all dots are transferred. The quantity-of-light control unit, when the peripheral dots are tuned off, controls the optical energy to be equal to a value obtained by adding to the reference value 100% the quantity of optical energy which has been compensated for by light-emission of the peripheral dots, in other words, the quantity of energy in percentage which is defined in the optical energy arithmetic matrix. The quantity-of-light control unit defines, as a reference value of optical energy of the noticeable dot, optical energy, e.g., 530% required for development of an isolated point. The quantity-of-light control unit, when the peripheral dots are tuned on, controls the optical energy to be equal to a value obtained by subtracting from the reference value 530% the quantity of optical energy which has been compensated for by light-emission of the peripheral dots. The quantity-of-light control unit, when the value of optical energy for controlling the noticeable dot exceeds the maximum value, e.g., 280% capable of being controlled per dot by the electrostatic recording unit, controls the optical energy so as to allocate the quantity of optical energy exceeding the maximum value 280% to adjoining dots. The quantity-of-light control unit, when the value of optical energy for controlling the noticeable dot exceeds the maximum value 280% capable of being controlled per dot by the electrostatic recording unit, may provide output of optical energy discretely through a plurality of scanning operations. The quantity-of-light control unit controls the optical energy for output so that the noticeable dot forms one dot isolated point. The quantity-of-light control unit controls the optical energy of the noticeable dot for output so that the density is not saturated with a high-density region. The quantity-of-light control unit, when using an LED array in said electrostatic recording unit, controls the optical energy of lighting dots by strobe time of a pulse train issued from LED elements.

The quantity-of-light control unit, when using an LED array, may control the optical energy of lighting dots by the quantity of light-emission per unit time of the LED elements. The quantity-of-light control unit, when a laser beam is scanned for development in the electrostatic recording unit, controls the optical energy of lighting dots by the pulse width per dot. The quantity-of-light control unit, when using the LED array the control is provided by converting the optical energy of lighting dots into gradation values, converts the optical energy into gradation values in such a manner that the gradation values have no equi-intervals (linearity). For example, the quantity-of-light control unit, when control is provided by converting said gradation values into strobe time of a pulse train issued from LED elements, performs conversion in such a manner that the pulse widths of the pulse train as a result of conversion of the gradation values have no equi-intervals. The quantity-of-light control unit, when control is provided by converting the gradation values into a drive current of the IED elements, performs the conversion in such a manner that a drive current of the LED elements which is obtained by converting the gradation values has no equi-interval increments.

The quantity-of-light control unit, when the size of exposed dots in an exposure system is smaller than the size of developed dots formed on the record paper by the electrostatic recording unit, controls the optical energy of lighting dots by the number of exposed dots lighting in developed dots. In the electrophotographic apparatus of the present invention, the quantity-of-light control unit may be subjected to selective control and non-control.

Further, the present invention provides an electrophotographic method comprising an electrostatic recording step in which dot latent images in conformity with image dot data are formed through lighting of scanning light onto a latent image carrier in motion, e.g., a rotating photosensitive drum arranged in the record paper conveyance direction and in which after developing with a toner component, dots are transferred onto the record paper for development; and a quantity-of-light control step in which for each lighting noticeable dot among the image dot data, optical energy for use in formation of the noticeable dot is controlled for output, on the basis of peripheral dots which may have influence on the size of the noticeable dot on the record paper.

The above and other objects, aspects, features and advantages of the present invention will become more apparent from the following detailed description with reference to the accompanying drawings.

BRIEF DESCRIPTION OF THE DRAWINGS

FIGS. 16A and 16B are explanatory diagrams of conversion of pulse train strobe time in accordance with FIG. 13;

FIG. 17 is an explanatory diagram of a latent image and the dot size of one dot line in accordance with the present invention;

FIGS. 21A and 21B are block diagrams of a hardware configuration in accordance with a third embodiment of the present invention.

DETAILED DESCRIPTION OF THE PREFERRED EMBODIMENTS

Figure 1:
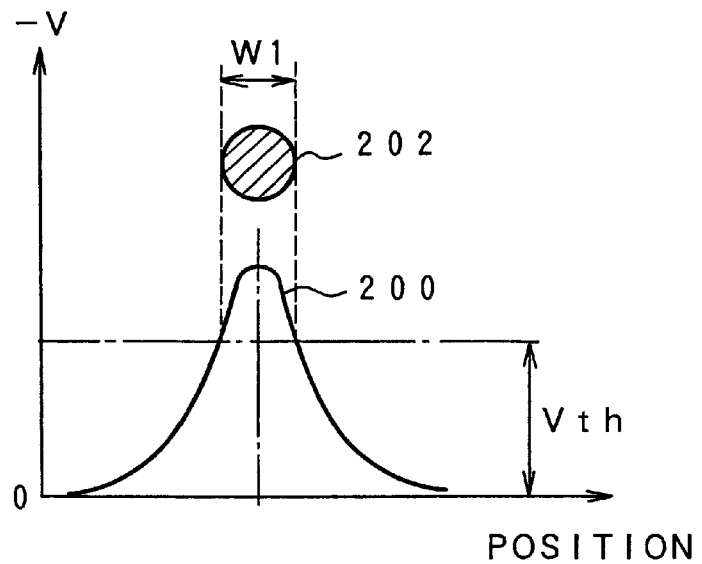
FIG. 1 is an explanatory diagram of a latent image and the dot size of conventional one dot line.
Figure 2:
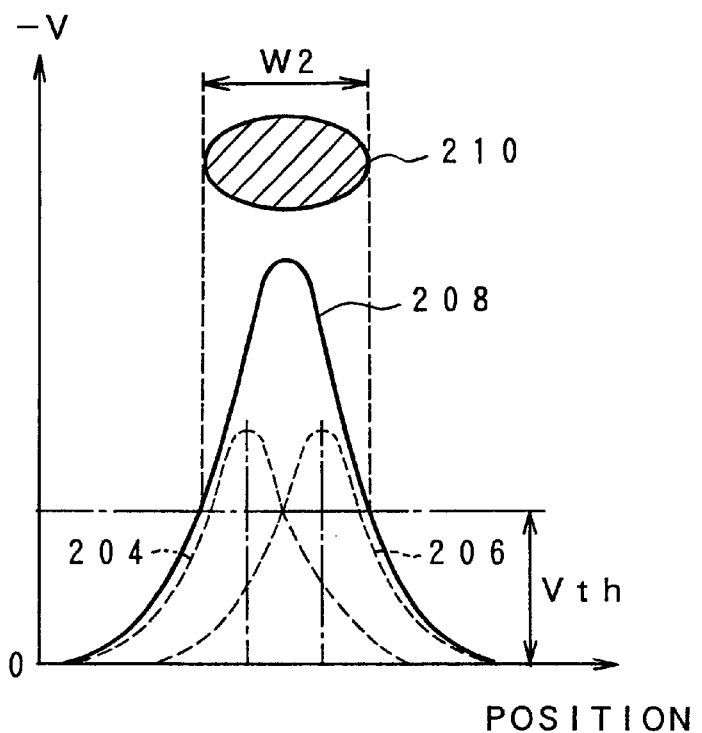
FIG. 2 is an explanatory diagram of latent images and the dot size of conventional two dot liens.
Figure 3:
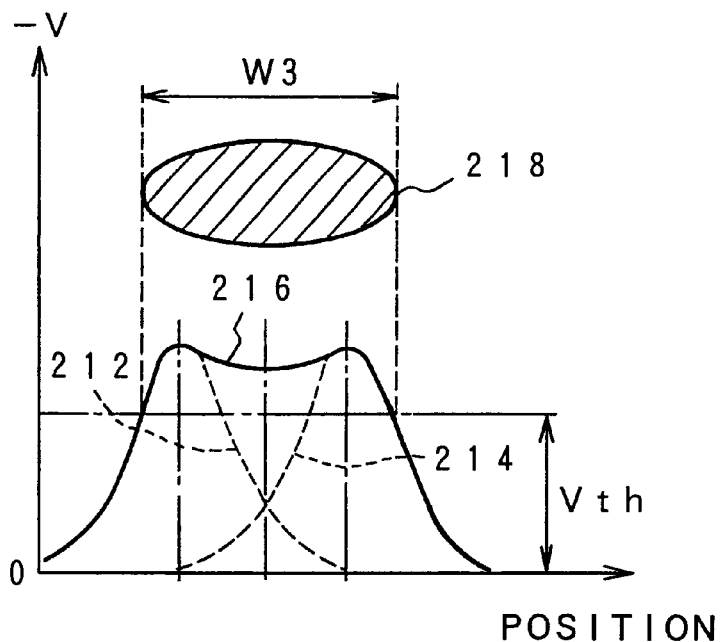
FIG. 3 is an explanatory diagram of latent images and the dot size of conventional two dot emission with one dot space.
Figure 4:
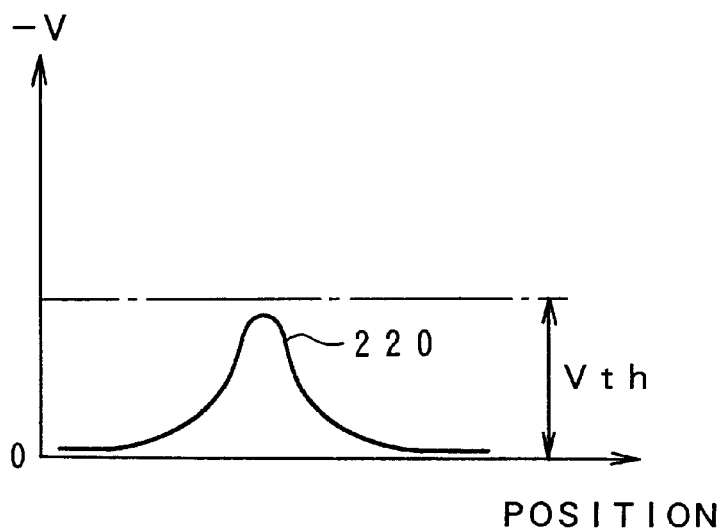
FIG. 4 is an explanatory diagram of a latent image and the dot size of one dot line obtained when optical energy is combined with conventional high-density development.
Figure 5:
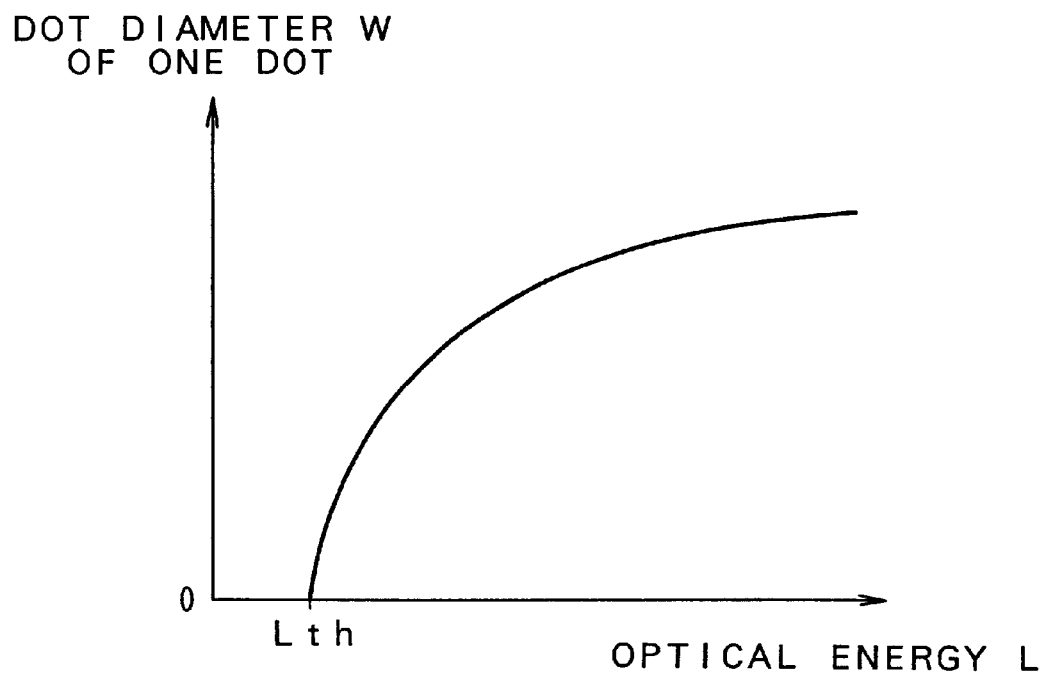
FIG. 5 is a non-linear characteristic diagram of the optical energy and the dot diameter in the electrophotographic process.
Figure 6:
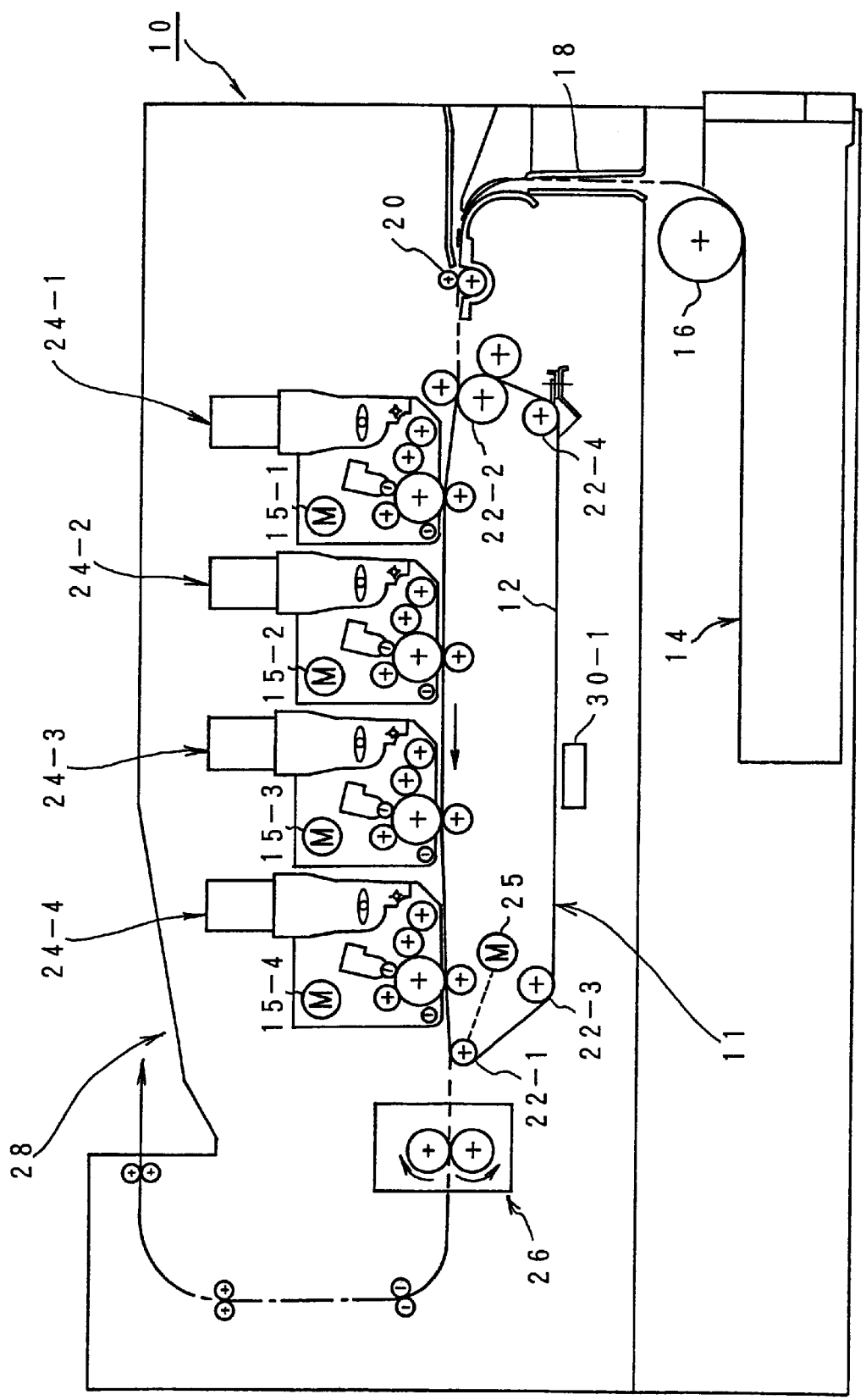
FIG. 6 is an explanatory diagram of an internal structure of the apparatus body of the present invention.

FIG. 6 illustrates an internal structure of an electrophotographic apparatus of the present invention in the form of a printer by way of example. An apparatus body 10 accommodates therein a conveyance belt unit 11 for conveying record media, e.g., record sheets of paper. The conveyance belt unit 11 is provided rotationally with an endless belt 12 made of a transmittable dielectric material, e.g., a suitable synthetic resin material. The endless belt 12 extends around four rollers 22-1, 22-2, 22-3 and 22-4. The conveyance belt unit 11 is removably mounted to the apparatus body 10. The roller 22-1 functions as a driving roller. The driving roller 22-1 connects via a gear train not shown to a belt motor 25 so as to cause the endless belt 12 to run at a certain speed in the clockwise direction indicated by an arrow. The drive roller 22-1 functions also as an AC elimination roller for eliminating electric charge from the endless belt 12. The roller 22-2 acts as a driven roller. The driven roller 22-2 acts also as a charging roller for imparting electric charge to the endless belt 12. The rollers 22-3 and 22-4 serve as guide rollers and are arranged in the vicinity of the driving roller 22-1 and the driven roller 22-2, respectively. An upper running part of the endless belt 12 between the driven roller 22-2 and the driving roller 22-1 forms a moving path for the record sheets of paper. The record sheets of paper are stacked in a hopper 14 and are picked up one by one from the topmost record sheet of paper in the hopper 14 by means of a pickup roller 16. The record paper then passes through a record paper guide passage 18 and is led by a pair of record paper feeding rollers 20 from the driven roller 22-2 side endless belt 12 onto the record paper moving path on the belt upper side. After having passed through the record paper moving path, the record paper is discharged from the drive roller 22-1. Since the endless belt 12 is charged by the driven roller 22-2, the record paper electrostatically adheres to the endless belt 12 when it is led from the driven roller 22-2 onto the record paper moving path, so that the record paper in motion is prevented from being positionally offset. On the other hand, the driving roller 22-1 on the discharge side serves as a charge eliminating roller, so that the endless belt 12 is cleared of electric charge at the region where the endless belt 12 comes into contact with the driving roller 22-1. For this reason, the record paper is cleared of electric charge when it passes through the driving roller 22-1, with the result that it is easily separated and discharged from the endless belt 12 without being caught by the lower belt part. The apparatus body 10 accommodates therein four electrostatic recording units 24-1, 24-2, 24-3 and 24-4 for Y, M, C and K, which are arranged in series, i.e., in a tandem manner from upstream toward downstream in the mentioned order along the record paper moving path on the upper side of the endless belt 12 defined between the driven roller 22-2 and the driving roller 22-1. The electrostatic recording units 24-1 to 24-4 are equipped with drum motors 15-1 to 15-4 for driving photosensitive drums and have substantially the same structure except that developing agents used are a yellow toner component (Y), a magenta toner component (M), a cyan toner component (C) and a black toner component (K), respectively. For this reason, the electrostatic recording units 24-1 to 24-4 transfer and record a yellow toner image, a magenta toner image, a cyan toner image and a black toner image onto the record paper moving along the record paper moving path on the upper side of the endless belt 12, in sequence and in a superposed manner, to form a full-color toner image. Furthermore, in the case of the present invention, adjustment is made so that the amount of consumption of the color toner components in the electrostatic recording units 24-1 to 24-4 are substantially the same. While the record paper passes through the record paper moving path on the endless belt 12 defined between the driven roller 22-2 and the driving roller 22-1, it is subjected to transfer and superposition of the four color toner images of Y, M, C and K by the electrostatic recording units 24-1 to 24-4 and comes to have a full-color image formed thereon. The record paper is then delivered from the driving roller 22-1 side toward a heat roller type thermal fixing device 26 to perform a thermal fixation of the full-color image on the record paper. After the completion of the thermal fixation, the record paper passes through the guide rollers and enters a stacker 28 provided above the apparatus body for stacking the record paper therein. Confronting the lower belt surface of the endless belt 12, there are arranged a pair of sensors 30-1 and 30-2 in the direction orthogonal to the belt moving direction, with the sensor 30-1 closer to the viewer being only visible. The sensors 30-1 and 30-2 are used to optically read a toner mark transferred onto the endless belt 12 to thereby correct the amount of a positional offset.

Figure 7A:
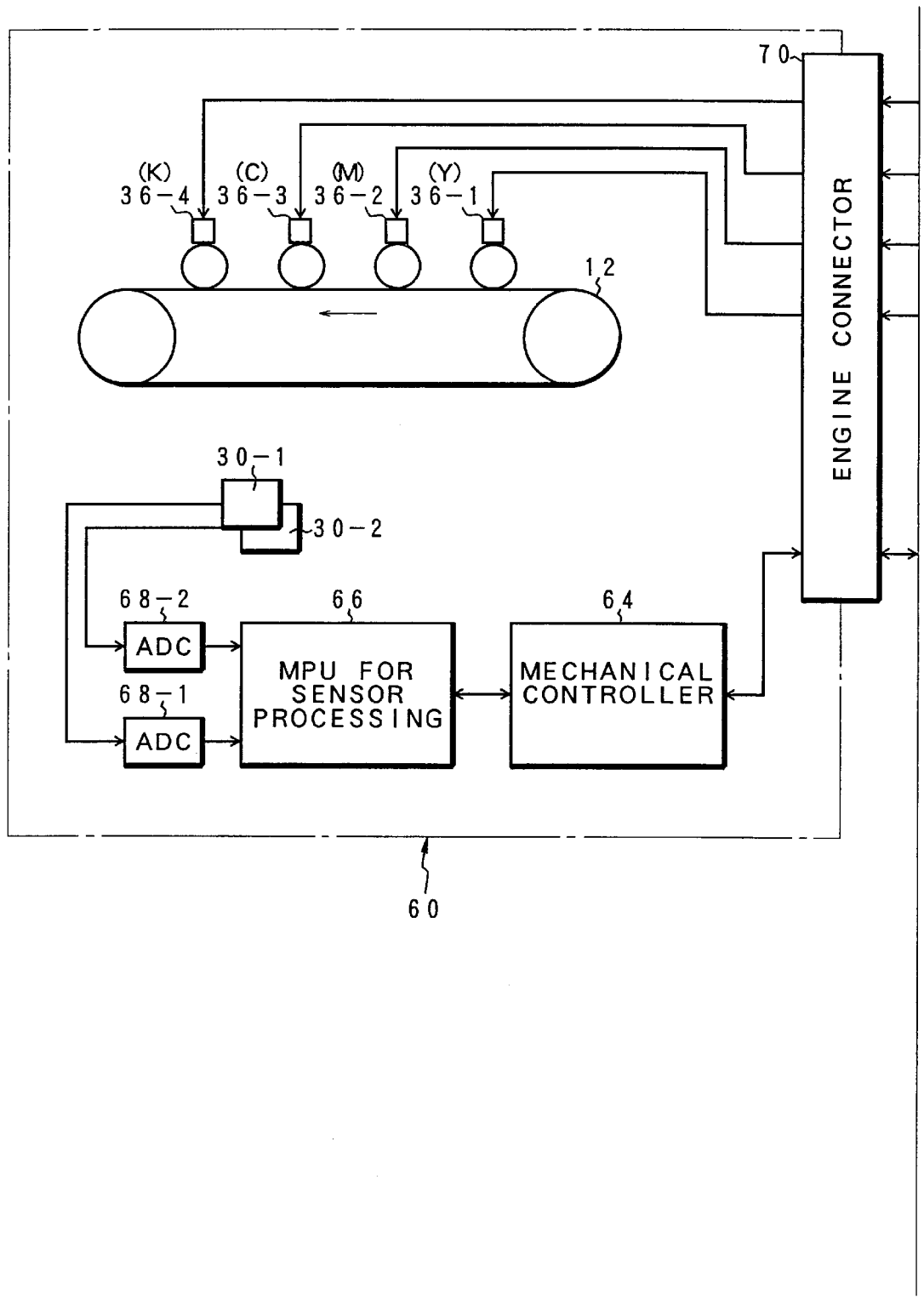
FIGS. 7A and 7B are explanatory diagrams of a hardware configuration in accordance with a first embodiment of the present invention.
Figure 7B:
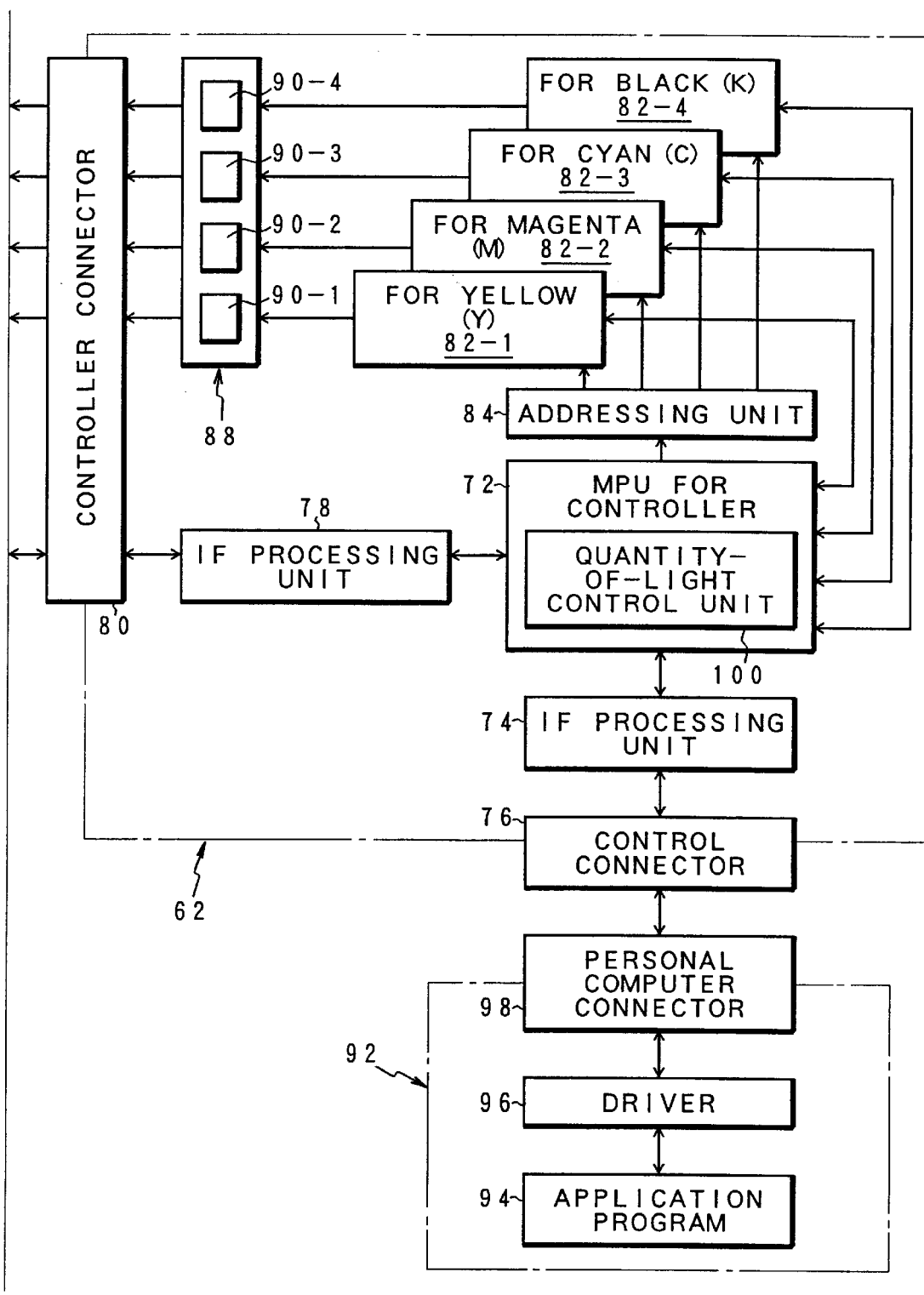

FIGS. 7A and 7B are block diagrams of a hardware configuration in accordance with a first embodiment of the printer of the present invention. The hardware of the present invention is constituted by an engine 60 and a controller 62. The engine 60 comprises a mechanical controller 64 for performing control actions of the printing mechanisms such as the conveyance belt unit 11 and the electrostatic recording units 24-1 to 24-4 of FIG. 6. The mechanical controller 64 is associated with an MPU 66 for sensor processing. The MPU 66 for sensor processing receives via AD converters 68-1 and 68-2 a detection signal from the pair of sensors 30-1 and 30-2 arranged below the endless belt 12. The mechanical controller 64 is connected to the controller 62 side by way of an engine connector 70. Herein, the printing mechanisms provided in the engine 60 are shown to exclusively include the endless belt 12 and LED arrays 36-1, 36-2, 36-3 and 36-4 provided on the electrostatic recording units of Y, M, C and K, respectively. The controller 62 comprises an MPU 72 for controller. To the MPU 72 for controller is connected an upper apparatus, e.g., a personal computer 92 by way of an interface processing unit 74 and a controller connector 76. The personal computer 92 includes a driver 96 for performing print processing of color image data fed from an arbitrary application program 94, the driver 96 being connected via a personal computer connector 98 to the controller connector 76 of the controller 62. The MPV 72 for controller of the controller 62 is associated with image memories 82-1, 82-2, 82-3 and 82-4. The MPU 72 for controller converts image data (gradation pixel data) of Y, M, C and K transferred from the personal computer 92 into binary dot data and deploys them into the image memories 82-1, 82-2, 82-3 and 82-4.

In this first embodiment, the MPU 72 for controller includes a quantity-of-light control unit 100 in accordance with the present invention. For each light-emitting noticeable dot among binarized image dot data, the quantity-of-light control unit 100 figures out a value of optical energy used for the formation of the noticeable dot, on the basis of peripheral dots which may have an influence on the size of the noticeable dot on the record paper. Further, the value of optical energy for light emission control calculated for each dot data is converted into gradation data for light emission driving of each LED chip provided in the LED arrays and then is deployed into the image memories 82-1, 82-2, 82-3 and 82-4. The MPU 72 for controller is able to selectively set either normal mode or optical energy control mode. When the normal mode is selected, the function of the quantity-of-light control unit 100 is made invalid and the image data (gradation pixel data) of Y, M, C and K are converted into binary dot data and deployed into the image memories 82-1, 82-2, 82-3 and 82-4. On the contrary, when the optical energy control mode is selected, the function of the quantity-of-light control unit 100 is made valid and image data (gradation pixel data) of Y, M, C and K are converted into binary dot data. Afterward, optical energy of each dot data is calculated, and the thus calculated optical energy is converted into gradation data for light emission driving of the LED chip and is deployed into the image memories 82-1, 82-2, 82-3 and 82-4. The selection and setting of the normal mode or the optical energy control mode in the MPU 72 for controller is carried out by the user or the system in compliance with the type of the print images such as letters, photographs and diagrams. The MPU 72 for controller is connected to the engine 60 by way of an interface processing unit 78 and a controller connector 80. The MPU 72 for controller is provided with an addressing unit 84 for designating addresses when respective color pixel data are deployed into the image memories 82-1 to 82-4. The image memories 82-1 to 82-4 are followed by a resolution converting unit 88. The resolution converting unit 88 includes buffer memories 90-1, 90-2, 90-3 and 90-4 correspondingly to the Y, M, C and K, respectively. The resolution converting unit 88 decomposes pixel data read from the image memories 82-1 to 82-4 in the vertical scanning direction (paper conveyance direction) in the LED arrays 36-1 to 36-4 and converts them into two high-resolution pixel data. If, for example, the resolution is 600 dpi in the horizontal scanning direction and 600 dpi in the vertical scanning direction upon the deployment into the image memories 82-1 to 82-4, then the resolution converting unit 88 performs a conversion into high-resolution pixel data of 600 dpi in the horizontal scanning direction but of 1800 dpi in the vertical scanning direction.

Figure 8:
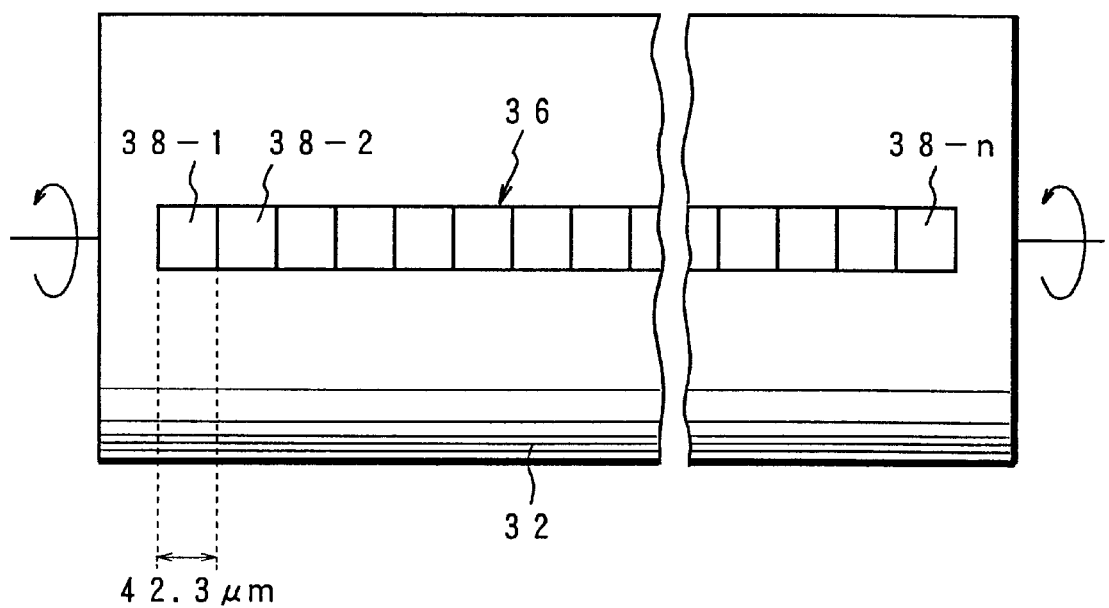
FIG. 8 is an explanatory diagram of a photosensitive drum and an LED array of an electrostatic recording unit.

FIG. 8 shows the state of arrangement of the LED array for the photosensitive drum provided in the electrostatic recording unit of FIG. 6. The LED array 36 consists of a plurality of LED chips 38-1, 38-2, . . . , 38-n serving as light emitting elements which are arranged in the horizontal scanning direction orthogonal to the rotational direction of a photosensitive drum 32. The pitch of the LED chips 38-1 to 38-n is 42.3 $\mu$m when the resolution is for example 600 dpi in the horizontal scanning direction. Further, the resolution in the vertical scanning direction coincident with the rotational direction of the photosensitive drum 32 depends on the drum peripheral speed. The width of the light emission in the drum rotational direction results in 14.1 $\mu$m when the resolution in the vertical scanning direction is for example 1800 dpi.

Figure 9:
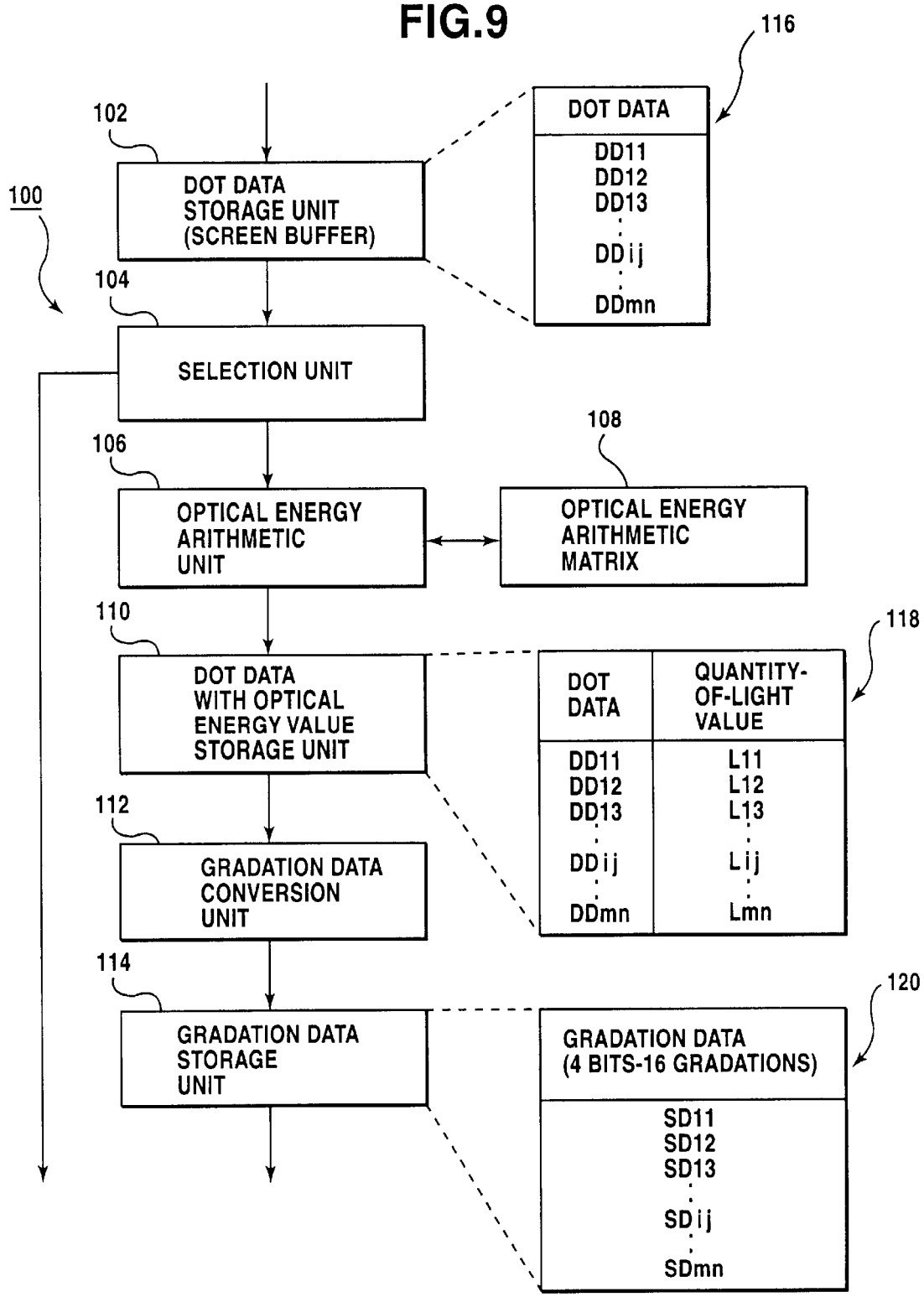
FIG. 9 is a function block diagram of a current control of present the invention.

FIG. 9 is a function block diagram of the quantity-of-light control unit 100 in accordance with the present invention provided in the MPU 72 for controller of the controller 62 of FIGS. 7A and 7B. The quantity-of-light control unit 100 is provided with a dot data storage unit 102 in the form of a screen buffer, a selection unit 104, an optical energy arithmetic unit 106, an optical energy arithmetic matrix 108, a dot data with optical energy value storage unit 110, and a gradation data conversion unit 112. The dot data storage unit 102 stores therein image dot data 116 which are extracted and shown on the right-hand side thereof and which are obtained by binarizing gradation pixel data of each pixel constituting the image data transmitted from the personal computer 92 side in FIGS. 7A and 7B. The image dot data 116 include dot data DD11 to DDmn having a pixel size for example of 7680 dots in the horizontal direction and of 5860 dots in the vertical scanning direction. The selection unit 104 selects the validity and invalidity of the control function of the quantity-of-light control unit 100. In response to the type of the print image for example, the selection unit 104 selects whether the quantity-of-light control unit 100 is made valid or invalid by the user setting or by the system setting. In this selection, as set forth with respect to the MPU 72 for controller of FIGS. 7A and 7B, setting of the normal mode invalidates the function of the quantity-of-light control unit 100 whereas setting of the optical energy control mode validates the function of the quantity-of-light control unit 100. More specifically, when the normal mode is selected, the image data 116 placed in the dot data storage unit 102 are intactly deployed into the image memories 90-1 to 90-4 of FIG. 7. On the contrary, when the optical energy control mode is selected, data subjected to processing by the optical energy arithmetic unit 106 and the gradation data conversion unit 112 are deployed into the image memories 90-1 to 90-4 of FIGS. 7A and 7B. The optical energy arithmetic unit 106 uses the optical energy arithmetic matrix 108 and, every time a light-emitting dot is selected in sequence as a noticeable dot among the image dot data 116, calculates the optical energy for the formation of the noticeable dot on the basis of the peripheral dots which may have an influence on the size of the selected noticeable dot on the record paper. With respect to the optical energy obtained taking into consideration the influence of the peripheral dots on the noticeable dot, the optical energy of the noticeable dot is figured out depending on the distance from the peripheral dots. The peripheral dots for use in the arithmetic of the optical energy of the noticeable dot are defined in the optical energy arithmetic matrix 108 and the rate (%) of the optical energy which may have an influence on the noticeable dot due to the light emission of the peripheral dots on the matrix is also defined in the optical energy arithmetic matrix 108.

Figure 10:
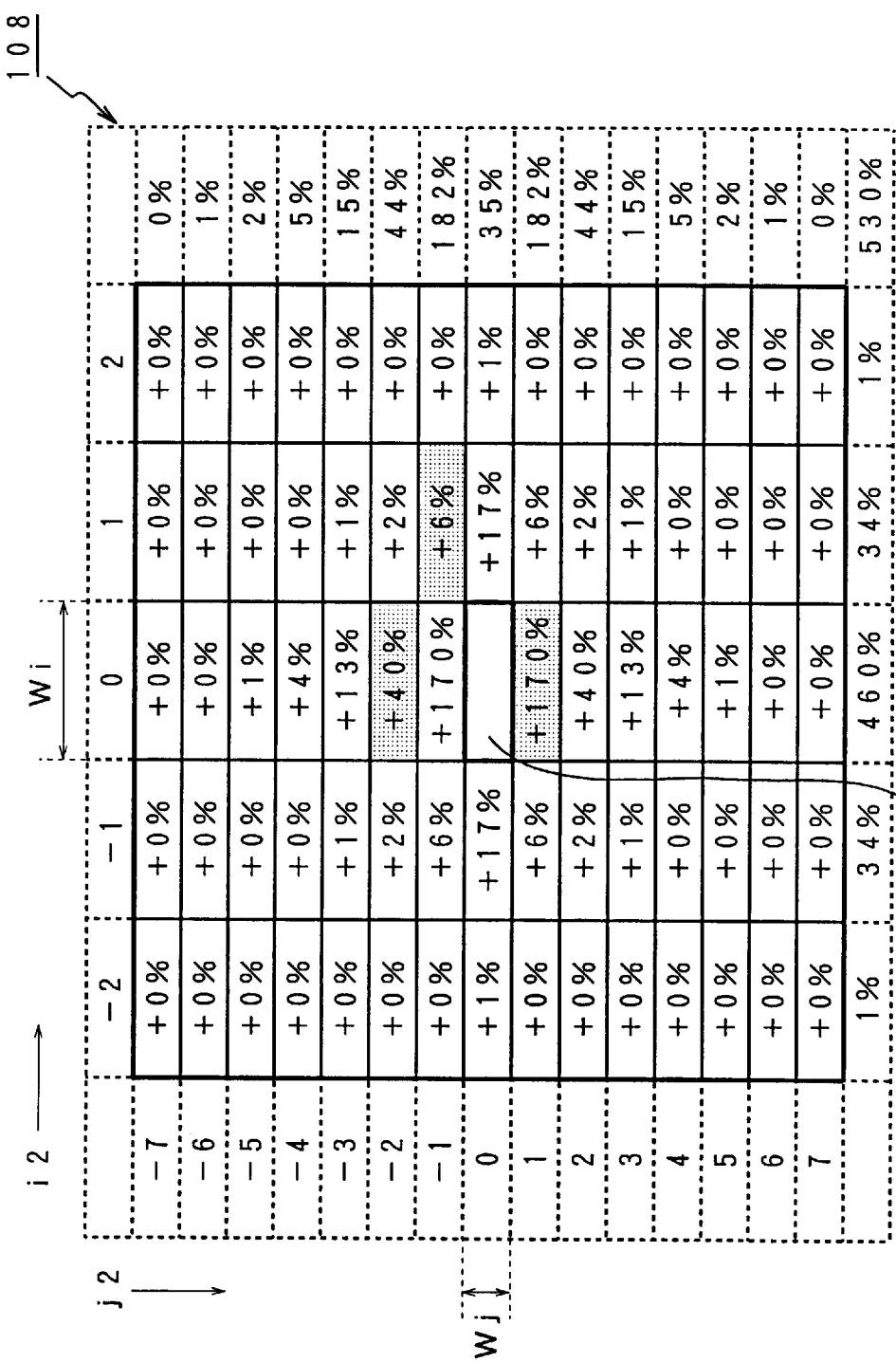
FIG. 10 is an explanatory diagram of an optical energy arithmetic matrix for use in calculation of optical energy FIG. 9.

FIG. 10 is a specific example of the optical energy arithmetic matrix 108 of FIG. 9. This optical energy arithmetic matrix 108 represents a print image resolution of 600 dpi in the horizontal scanning direction and of 1800 dpi in the vertical scanning direction, in which case the one dot size Wi in the horizontal scanning direction to be light emission controlled correspondingly to the resolution 600 dpi in the horizontal scanning direction is 42.3 μm and the one dot size Wj in the vertical scanning direction is 14.1 μm. In a manner corresponding to such a print image resolution, the optical energy arithmetic matrix 108 of FIG. 10 has a dot matrix of (5×15), that is, in the range of −2 to +2 in the horizontal scanning direction and of −7 to +7 in the vertical scanning direction around a noticeable dot 122. This optical energy arithmetic matrix 108 having the size of (5×15) previously defines the rate of optical energy which may have an influence on the noticeable dot 122 as the shown percentage values depending on the distance from the noticeable dot. In this case, the reference optical energy in the optical energy arithmetic matrix 108 is set to 100%. The reference optical energy of 100% is defined as an optical energy posing no excess exposure in the solid print with respect to the print image having a resolution of 600 dpi in the horizontal scanning direction and of 1800 dpi in the vertical scanning direction. In response to this, defined as an optical energy presenting a maximum value is an optical energy of, e.g., 530% required for the development of isolated one dot having a size corresponding to the resolution of 600 dpi in the horizontal scanning direction and of 1800 dpi in the vertical scanning direction. Further, the maximum optical energy capable of being emitted by each of the LED chips 38-1 to 38-n in the LED array 36 of FIG. 8 is for example 280%, and optical energy exceeding 280% is allocated to the adjoining dots for the control of the optical energy.

Methods of calculating the optical energy for each dot by the optical energy arithmetic unit 106 of FIG. 9 include an addition method and a subtraction method. The optical energy arithmetic algorithm by the addition method is as follows.

[Addition Algorithm]

I) Determine a reference optical energy 100%. Define as the reference optical energy 100% an optical energy posing no excess exposure in solid print.

II) Select an arbitrary noticeable dot. If the noticeable dot is a light-emitting dot, assume that the optical energy of the noticeable dot is the reference optical energy 100%.

III) Using the optical energy arithmetic matrix 108 of FIG. 10, select non-light-emitting peripheral dots from the peripheral dots of the noticeable dot 122 and add the optical energies defined for the non-light-emitting peripheral dots to the noticeable dot 122. If for example there exist three dots having coordinates (1, −1), (0, 1), (0, −2) indicated by meshes as the peripheral dots, the degrees of influence of the respective optical energies are 6%, 170% and 40%, and hence these are added to the reference optical energy which has initially been set for the noticeable dot 122 to obtain $$100\%+6\%+170\%+40\%=316\%$$

IV) The LED chip of this embodiment is capable of light-emitting in 16 gradations in four bits and the gradation values are defined at every 20% from 0% (turned off) and 100% up to 280% upon lighting, over which there goes the optical energy 316% which is the value obtained by calculating the maximum light-emitting energy 280% with respect to the noticeable dot. Therefore, the excess 36% of the optical energy 316% calculated for the definition of the maximum value 280% is added to the calculation of the underlying dots adjoining the noticeable dot 122.

V) Such optical energy calculation is carried out for all the dots to determine the optical energies of the light-emitting dots.

Following is description of the optical energy arithmetic algorithm in accordance with the subtraction method.

[Subtraction Algorithm]

I) Determine a reference optical energy. Define as the reference optical energy an optical energy 100% posing no excess exposure in solid print in the same manner as the addition method.

II) Select an arbitrary light-emitting dot as a noticeable dot and assume that the optical energy of the noticeable dot is optical energy 530% which is required for the development of isolated one dot.

III) Using the optical energy arithmetic matrix 108 of FIG. 10, examine light-emitting dots in the peripheral dots of the noticeable dot 122 and subtract the values of the light-emitting dots defined on the matrix from the noticeable dot. If for example three dots having coordinates (1, −1), (0, 1), (0, −1) indicated by meshes around the noticeable dot 122 of the optical energy arithmetic matrix 108 of FIG. 10 emit light, optical energies of the respective light-emitting peripheral dots are 6%, 170% and 40%, and hence the optical energy of the noticeable dot 122 is given as $$530\%-6\%-170\%-170\%=184\%$$

IV) The LED chip of the present invention is capable of light-emitting in 16 gradations in four bits and the gradation values are defined at every 20% from 0% (turned off) and 100% up to 280% upon lighting. The optical energy 184% calculated for the noticeable dot 122 results in an optical energy of 180% gradation by rounding off. If the optical energy of the noticeable dot 122 obtained by the subtraction goes over the maximum value 280% of the LED chip, then the excess optical energy is added to the calculation of the adjoining underlying dots.

V) Such processing is carried out for all the dots to determine the optical energies of the light-emitting dots.

In this case, the reference value 100% of optical energy to be initially set for the noticeable dot is defined as an optical energy posing no excess exposure in solid print in both the optical energy arithmetic algorithms of the addition method and the subtraction method, although the present invention is not limited to this but the 100% reference optical energy can arbitrarily be defined as an optical energy satisfying appropriate exposure status. By defining an appropriate reference optical energy 100% in this manner, the maximum value at which the LED can emit light and the value of optical energy of isolated one dot to be initially defined upon the execution of the subtraction method will relatively vary depending on how to determine the reference optical energy 100%.

Figure 11:
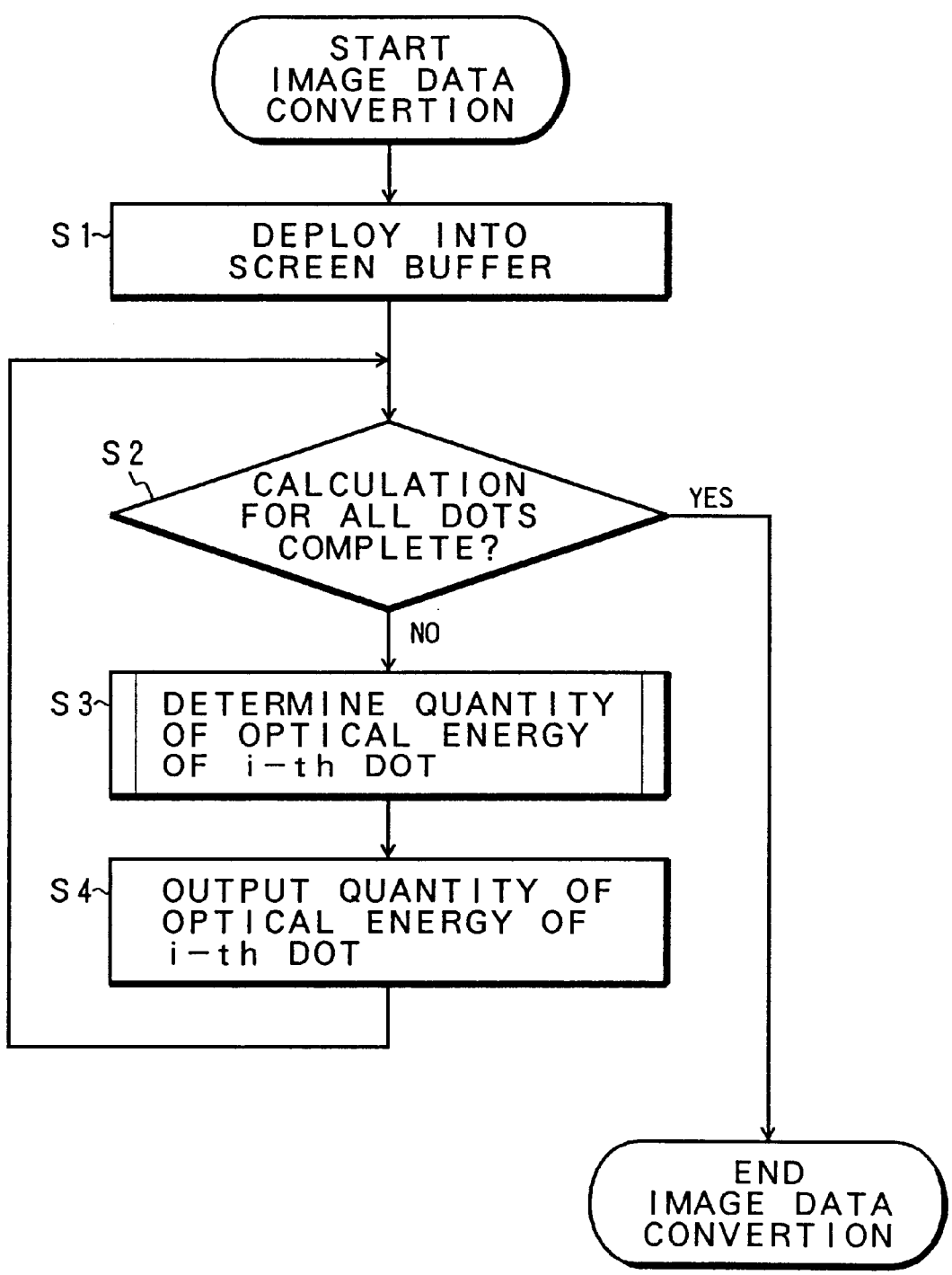
FIG. 11 is a flowchart of image data conversion processing of the present invention.

FIG. 11 is a schematic flowchart of arithmetic processing executed by the optical energy arithmetic unit 106 provided in the quantity-of-light control unit 100 of FIG. 9. First in step S1, binarized image dot data 116 are deployed into the screen buffer in the form of the dot data storage unit 102. Then procedure goes to step S2 in which dot data are fetched in sequence in the order of horizontal scanning direction and the vertical scanning direction and in which check is made to see if calculation for all dots has been completed or not. If not, then the procedure goes to step S3 in which the currently fetched i-th dot is defined as a noticeable dot to determine the quantity of the optical energy by the addition method or the subtraction method using the optical energy arithmetic matrix 108. Then in step S4, the quantity of optical energy of the thus determined i-th dot is provided as its output and next dot is again fetched from the screen buffer to repeat the same arithmetic and output of the optical energy. If completion of arithmetic for all the dots is judged in step S2, then the image data conversion processing is complete.

Figure 12:
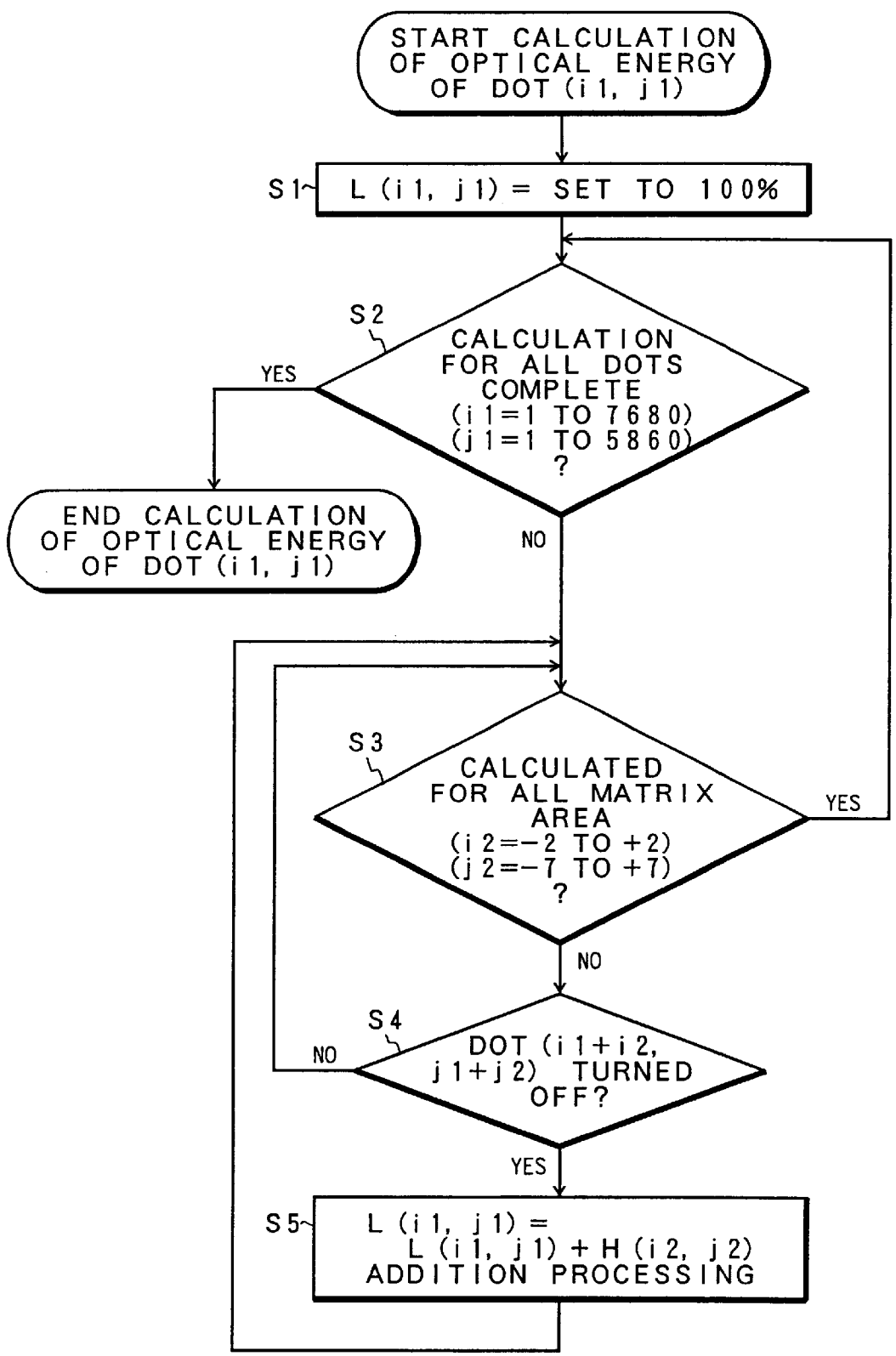
FIG. 12 is a flowchart of the optical energy arithmetic processing of FIG. 10 in accordance with the addition method.

FIG. 12 is a flowchart of arithmetic processing for determining the optical energy executed in step S3 of FIG. 11, in which the optical energy is figured out by the addition method. Once starting arithmetic of optical energy of an arbitrary noticeable dot (i1, j1), a reference value L (i1, j1) of the optical energy is defined as 100% in step S1. This reference energy 100% is an optical energy posing no excess exposure in solid print for example. Procedure then goes to step S2 in which check is made to see if arithmetic for all dots has been completed or not. In this embodiment, the dot count to be calculated is 7680 dots in the horizontal scanning direction and 5860 dots in the vertical scanning direction, and hence the counter i1 in the horizontal scanning direction will vary 1 to 7680 and the counter j1 in the vertical scanning direction will vary 1 to 5860. Thus when i1=7680 and j1=5860 are exceeded, the completion of arithmetic of all dots is judged. If the arithmetic of all dots has not yet been completed, procedure goes to step S3 in which check is made to see if arithmetic has been made of all the areas of the optical energy arithmetic matrix 108 of FIG. 10. The positions of dots in the optical energy arithmetic matrix 108 are represented by the horizontal scanning direction i1 and the vertical scanning direction j2, with their respective counters i2 and j2 varying from −2 to +2 and from −7 to 7, respectively, allowing (5×15) dots to be subjected to the arithmetic of optical energy. If arithmetic in entire matrix area has not yet been completed in step S3, then the procedure goes to step S4 in which check is made to see if a dot at a position (j1+j2, j1+j2) which is obtained by adding the position (i2, j2) of a peripheral dot on the matrix to the position (i1, j1) of the noticeable dot in accordance with the addition algorithm is turned off or not. If it is lit, the arithmetic of optical energy is not carried out. If it is turned off, procedure goes to step S5 in which the optical energy H (i2, j2) of the peripheral dot is added to the optical energy L (i1, j1) of the noticeable dot. In step S3, such processing is repeated for all the dots in the optical energy arithmetic matrix 108. After the completion of arithmetic for entire matrix area, procedure goes back to step S2 in which the next dot is fetched to repeat the same processing. In this case, upon the return to step S2 after the determination of the optical energy of the noticeable dot, if the thus determined optical energy exceeds the maximum value 280% which the LED can emit, the excess optical energy is allocated to the adjoining underlying dots. For this reason, in the arithmetic of optical energy of the succeeding dot which has received allocation of optical energy from the preceding dot, the addition of energy due to turn-off of the peripheral pixels is carried out to the initial value which is the sum of reference energy 100% and the excess optical energy subjected to allocation.

Figure 13:
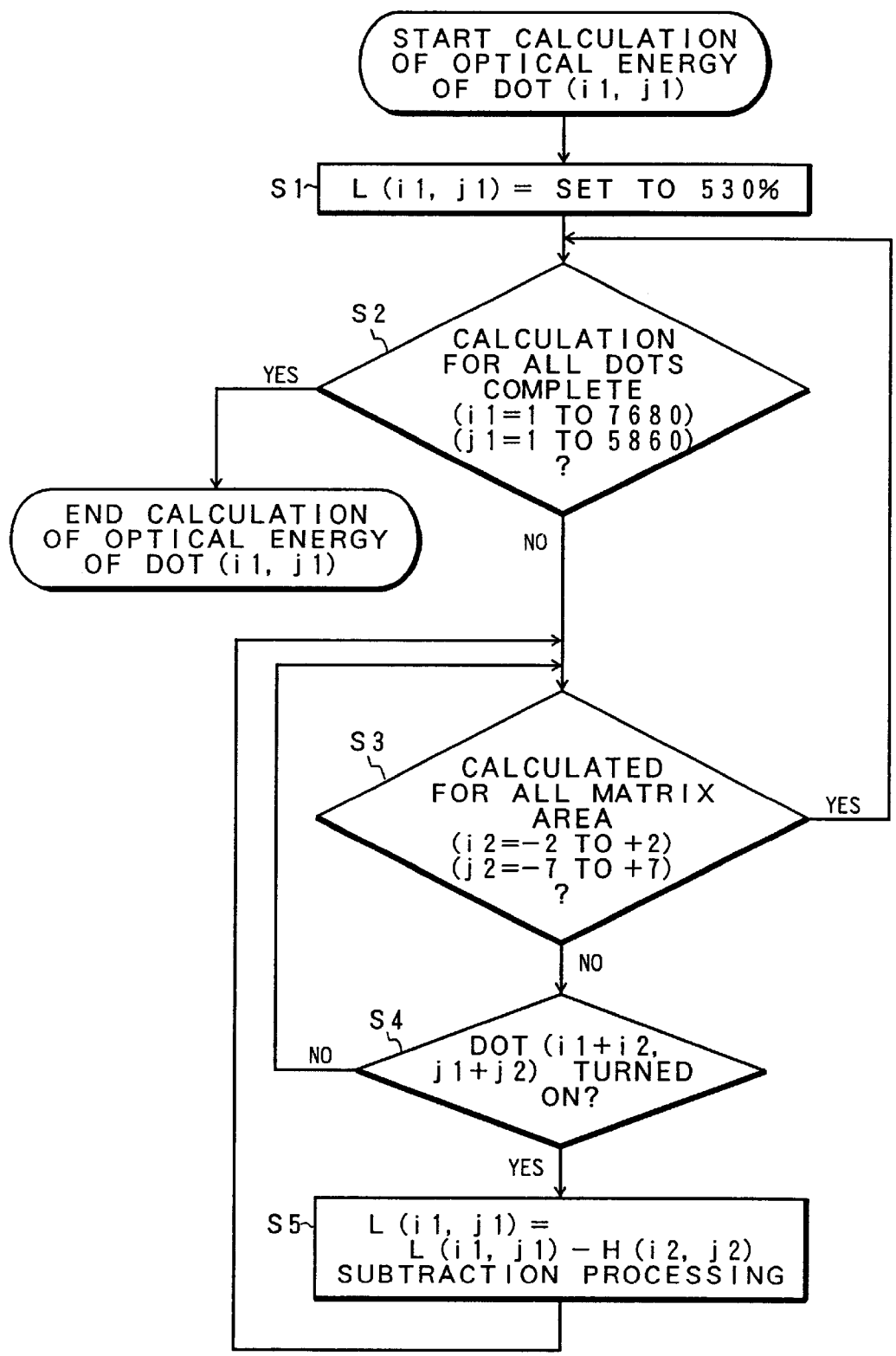
FIG. 13 is a flowchart of the optical energy arithmetic processing of FIG. 10 in accordance with the subtraction method.

FIG. 13 is a flowchart of arithmetic processing for determining optical energy in step S3 of FIG. 11, which is characterized in that the optical energy is figured out by the subtraction algorithm. FIG. 13 differs from the case of addition algorithm of FIG. 12 in the processing of steps S1, S4 and S5. First in step S1, the reference value L (i1, j1) of optical energy is set to 530%. In step S4, check is made in accordance with the subtraction algorithm to see if a dot at the position (i1+i2, j1+j2) which is obtained by adding the position (i2, j2) of a peripheral dot on the matrix to the position (i1, j1) of the noticeable dot is turned off or not. If it is tuned off, no arithmetic of the optical energy is carried out. If it is turned on, procedure goes to step S5 in which the optical energy H (i2, j2) of the peripheral dot is subtracted from the optical energy L (i1, j1) of the noticeable dot. In step 3, such processing is repeated for all dots in the optical energy arithmetic matrix 108.

Referring again to FIG. 9, dot data with the optical energy value calculated by the optical energy arithmetic unit 106 are stored into the dot data with optical energy value storage unit 110. As shown solely on the right-hand side, the dot data with optical energy value storage unit 110 stores therein dot data DD11 to DDmn and correspondingly thereto optical energy values L11 to Lmn determined as values of quantity-of-light. Then the optical energy value of each dot data calculated by the optical energy arithmetic unit 106 is converted into gradation data of 16 gradation of the LED chip by the gradation data conversion unit 112 and is stored as image gradation data 120 into a gradation data storage unit 114. The gradation data 120 result in gradation data SD11 to SDmn which are represented by e.g., four-bit 16 gradations. The gradation data conversion unit 112 converts into a gradation value the optical energy value determined for each dot, the conversion into the gradation value being a conversion which does not present any equi-interval gradation in accordance with the non-linear characteristic.

Figure 14:
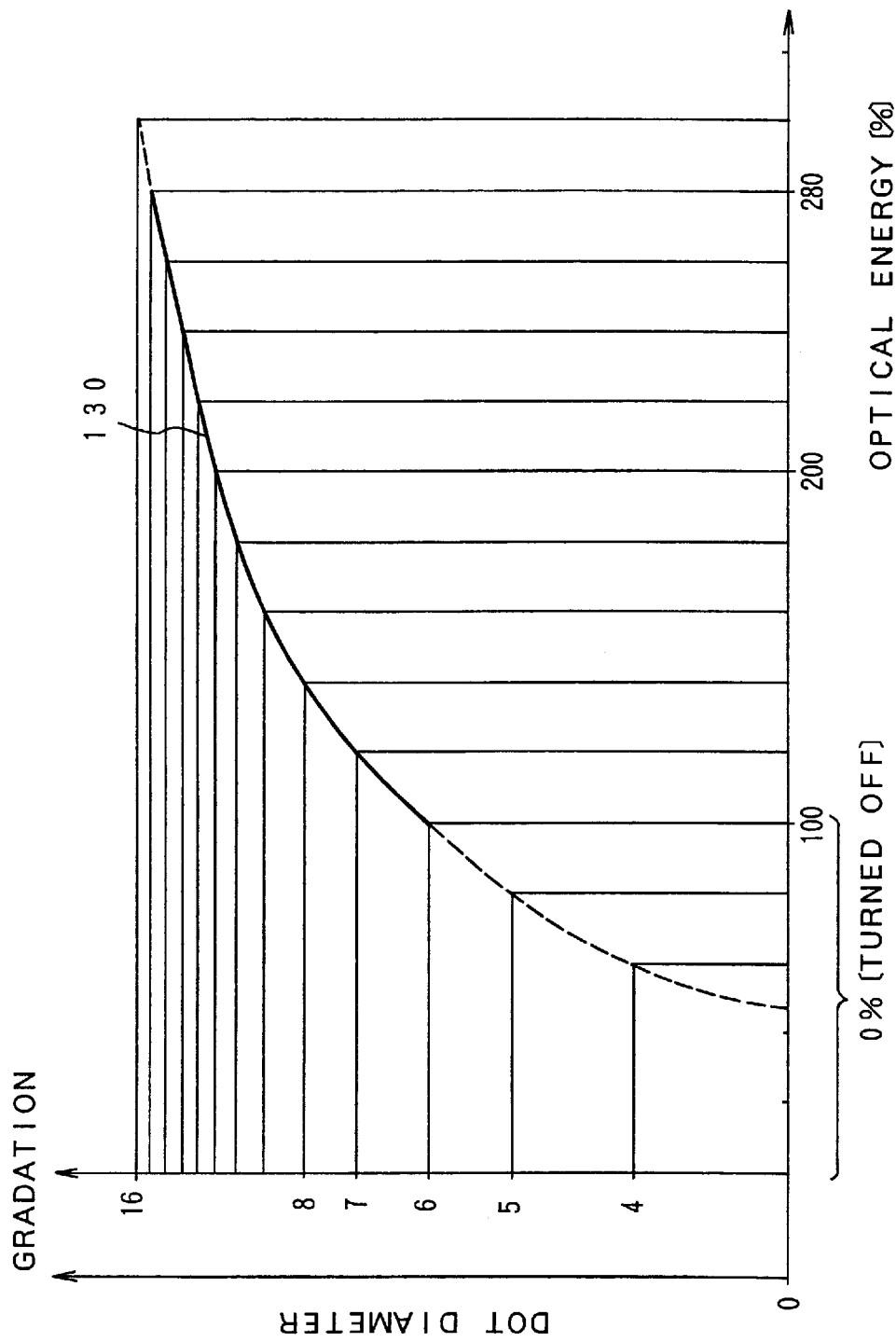
FIG. 14 is an explanatory diagram of conversion from optical energy into gradation values in FIG. 9.

FIG. 14 shows the characteristic of conversion from the optical energy into the gradation value, which is executed by the gradation data conversion unit 112 of FIG. 9. This conversion characteristic 130 corresponds to the non-linear characteristic of developed dot diameters which are formed correspondingly to the quantity of supply of the optical energy to the photosensitive drum in the electrostatic recording unit of FIG. 8. More specifically, the optical energy of FIG. 14 has equi-interval 16 gradations at 20% increments from 0% to 280%, and correspondingly the developed dot diameters has unequi-interval 16 gradations in accordance with the non-linear characteristic 130. On the contrary, four-bit 16 gradations of the LED chip are basically equi-interval, and are unable to provide the unequi-interval gradations corresponding to the dot diameters of FIG. 13. Thus, the present invention provides unequi-interval gradation control for gradating the dot diameters in accordance with the conversion characteristic 130 of FIG. 14, with the quantity of control for driving the light emission of the LED.

Figure 15:
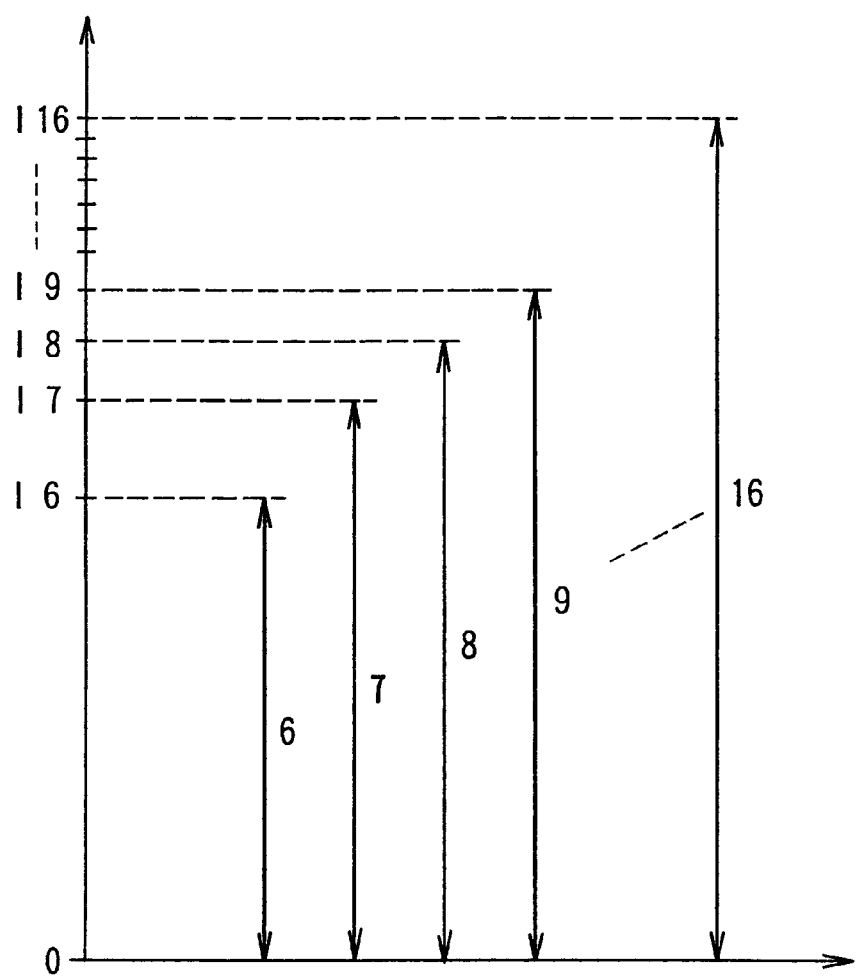
FIG. 15 is an explanatory diagram of conversion of LED light-emission current in accordance with FIG. 13.

FIG. 15 shows increments of current for controlling the LED light emission drive current in a manner corresponding to the equi-interval gradations of the dot diameters of FIG. 14. In the present invention, 0% of turned-off is seen when the optical energy is less than 100%, and hence the light emission drive current values I6 to I16 corresponding to the gradation values of the dot diameters on the vertical axis of FIG. 14 are defined for the gradation values 6, 7, 8, 9, . . . 16 at 20% increments over 100%.

FIGS. 16A and 16B show other LED drive signals for providing the control of light emission by the unequi-interval gradation values of the present invention. These are examples of a strobe control in which pulse trains of the number corresponding to the number of gradations are selectively emitted. FIG. 16A shows an ordinary strobe pulse train for use in the equi-interval gradation values. In the case of 16 gradations, 16 pulse timings designated by the gradation values 1 to 16 is prepared so that the pulse trains of the number corresponding to the number of the gradation values are emission driven by the strobe time control. For example, in case of the gradation value 4, the strobe time is controlled so that four pulse trains from the foremost gradation 1 to the gradation 4 are subjected to emission drive. It would be impossible for the strobe pulse having the equi-interval pulse trains of FIG. 16A to provide an emission control corresponding to the unequi-interval gradation values as shown in FIG. 14. Thus, as shown in FIG. 16B, there is prepared a strobe pulse train having pulse widths in accordance with the equi-interval gradation values corresponding to the dot diameters. This strobe pulse train has a maximum pulse width on the side of the gradation value 1 but has a minimum pulse width on the side of the gradation value 16. Then the strobe time is controlled so as to emission drive the pulse trains of the number corresponding to the unequi-interval gradation values obtained in accordance with the non-linear characteristic 130 of FIG. 14 from the optical energy.

The above embodiment has employed exposure by the LED array by way of example. However, in the case of the electrostatic recording unit in which a laser beam from laser diodes in place of the LEDs is scanned in the direction orthogonal to the rotational direction of the photosensitive drum, the optical energy of the emitting dots is controlled by the pulse widths per dots, so that control may be provided so as to ensure that these pulse widths result in pulse widths corresponding to the unequi-interval gradation values in accordance with the non-linear characteristic 130 of FIG. 14. Further, in case the dot size of the exposure system by the electrostatic developing unit is smaller than the dot size developed on the record paper, the optical energy of emitting dots can be gradation controlled by the number of the light-emitting dots contained in the developed dots. In this manner, also as to the gradation control based on the number of cases where a plurality of exposure dots are positioned within the developed dots, there may be performed the gradation control based on the number of unequi-intervals corresponding to the unequi-interval gradation values in accordance with the non-linear conversion characteristic 130 of FIG. 14 from the optical energy.

FIG. 17 shows, by way of example of isolated one dot, a latent image and a developed dot formed by exposure based on the optical energy which has been obtained by the quantity-of-light control unit 100 taking into consideration the influence of light-emission of peripheral dots. This isolated one dot is exposed to optical energy 530% of the isolated one dot exposure, with the optical energy posing no excess exposure in solid print being the reference optical energy 100% for example. In this case, there is obtained a developed dot 124 of normal size in a manner corresponding to a latent image 122 exceeding a threshold value Vth with respect to the bias voltage-V.

Figure 18:
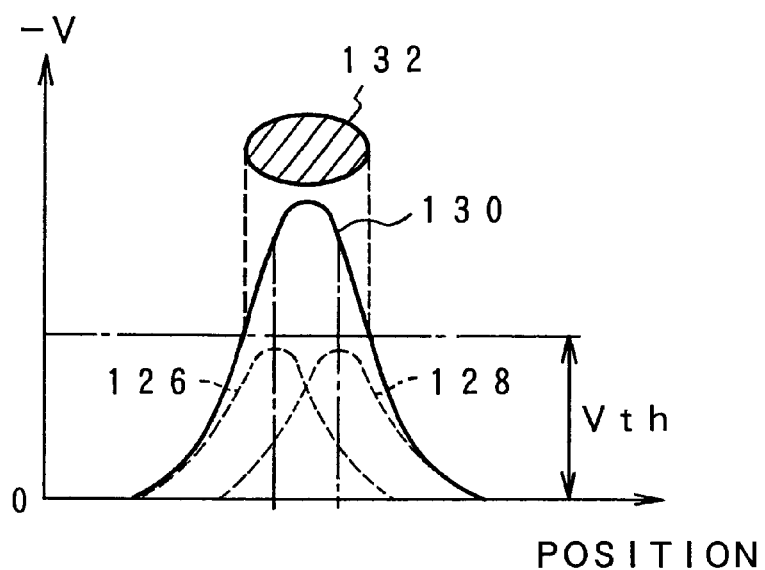
FIG. 18 is an explanatory diagram of latent images and the dot size of two dot lines in accordance with the present invention.

FIG. 18 shows a latent image and a developed dot formed by two dot line exposure. In the case of the two dot lines, adjoining dots present mutual optical influences, so that as compared with FIG. 17 the optical energy is reduced by that influence. As a result, there are formed latent images 126 and 128 indicated by broken lines which do not exceed the threshold value Vth at which dot formation is carried out. The resultant combined latent image becomes shown as a latent image 130 indicated by solid line. A developed dot 132 is thus formed which is substantially double the size of the isolated one dot of FIG. 17.

Figure 19:
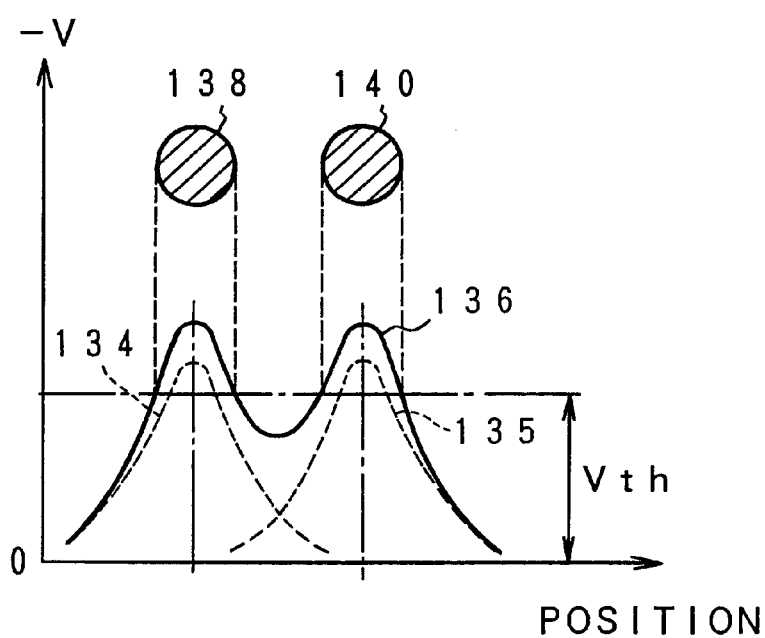
FIG. 19 is an explanatory diagram of a latent image and the dot size of two dot emission with one dot space in accordance with the present invention.

FIG. 19 shows a case of exposure of two dots with one dot space. In this case as well, the optical energy of each dot is reduced as compared with FIG. 18 taking into consideration the mutual optical influences. Broken line latent images 134 and 135 are formed by their respective optical energies and a combined latent image is shown as a solid line latent image 136. As a result of this, there can be formed developed dots 138 and 140 of substantially the same size as the isolated one dot of FIG. 18 correspondingly to the part of the latent image exceeding the threshold value Vth.

Figure 20A:
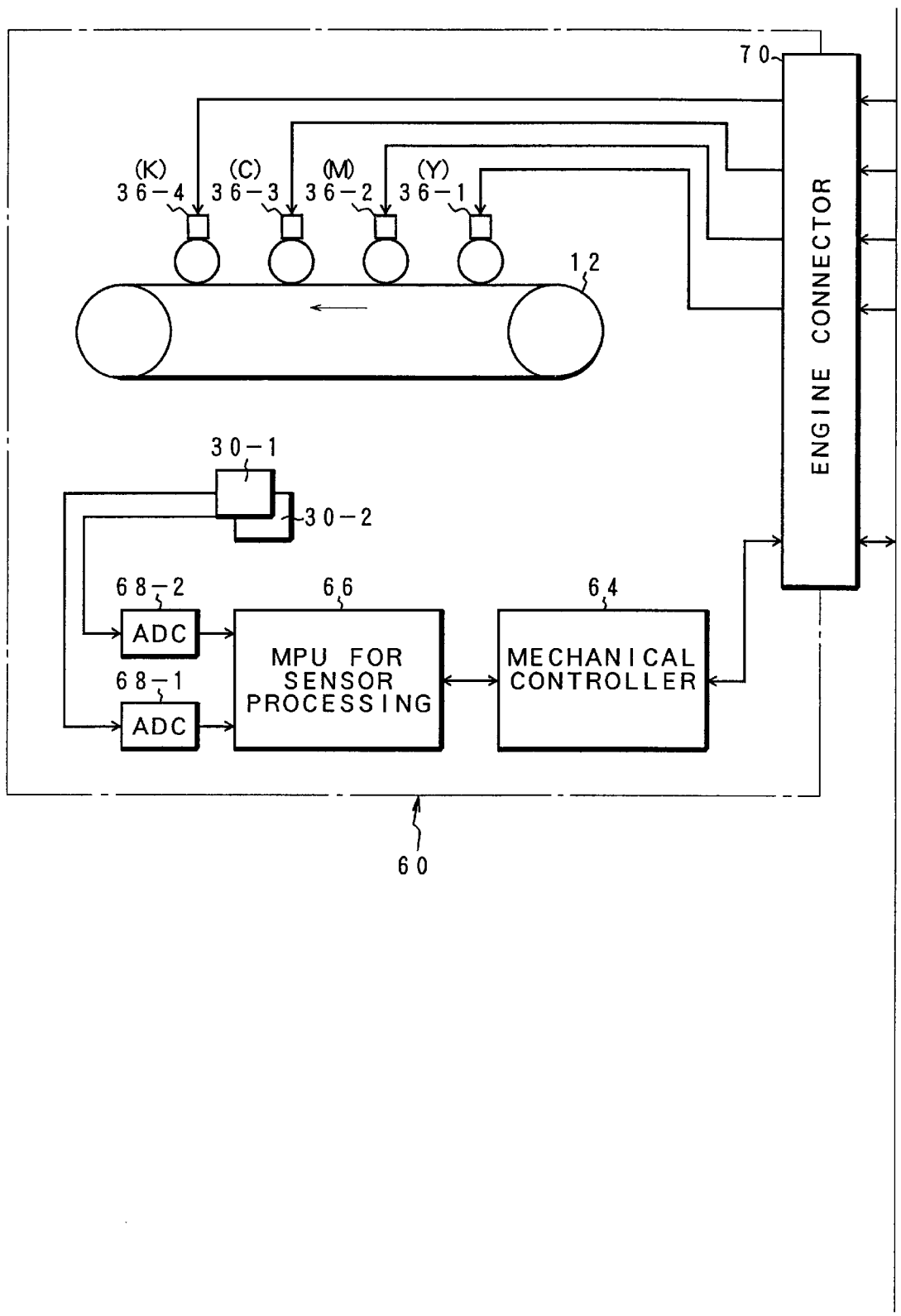
FIGS. 20A and 20B are block diagrams of a hardware configuration in accordance with a second embodiment of the present invention.
Figure 20B:
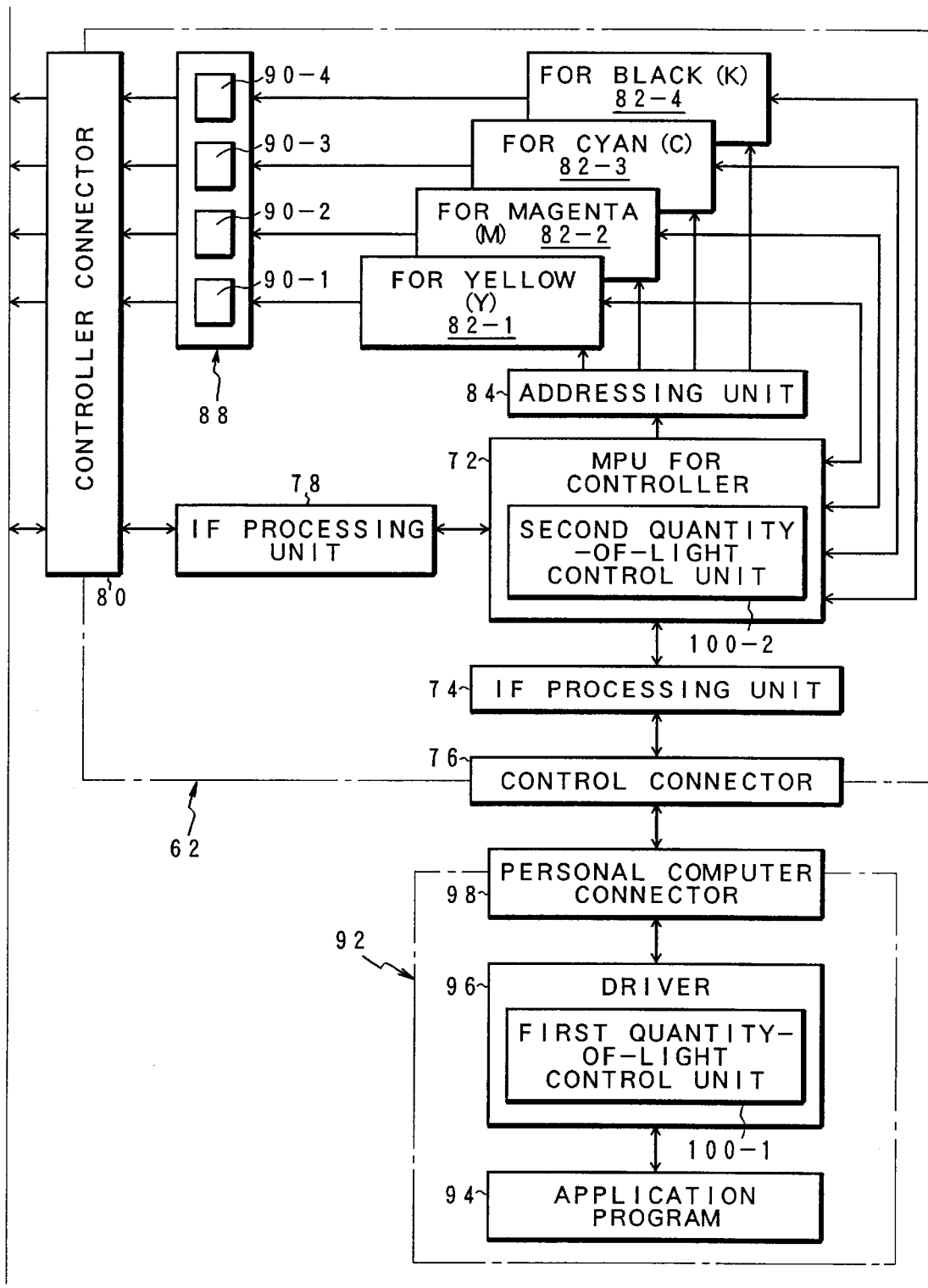

FIGS. 20A and 20B show a second embodiment of the hardware configuration in accordance with the present invention. This embodiment is characterized in that the quantity-of-light control unit 100 of FIG. 9 consists of a first quantity-of-light control unit 100-1 provided in the driver 96 of the personal computer 92 and a second quantity-of-light control unit 100-2 provided in the MPU 72 for controller of the printer associated controller 62. The first quantity-of-light control unit 100-1 provided in the driver 96 of the personal computer 92 includes the dot data storage unit 102 in the quantity-of-light control unit 100 of FIG. 9, the selection unit 104, the optical energy arithmetic unit 106, the optical energy arithmetic matrix 108, and the dot data with optical energy value storage unit 110. On the contrary, the gradation data conversion unit 112 and the gradation data storage unit 114 are provided in the second quantity-of-light control unit 100-2 of the MPU 72 for controller associated with the printer.

Naturally, the entirety of the quantity-of-light control unit 100 of FIG. 9 may be provided in the driver 96 of the personal computer 92. The other configuration is the same as that of the first embodiment of FIG. 7.

Figure 21A:
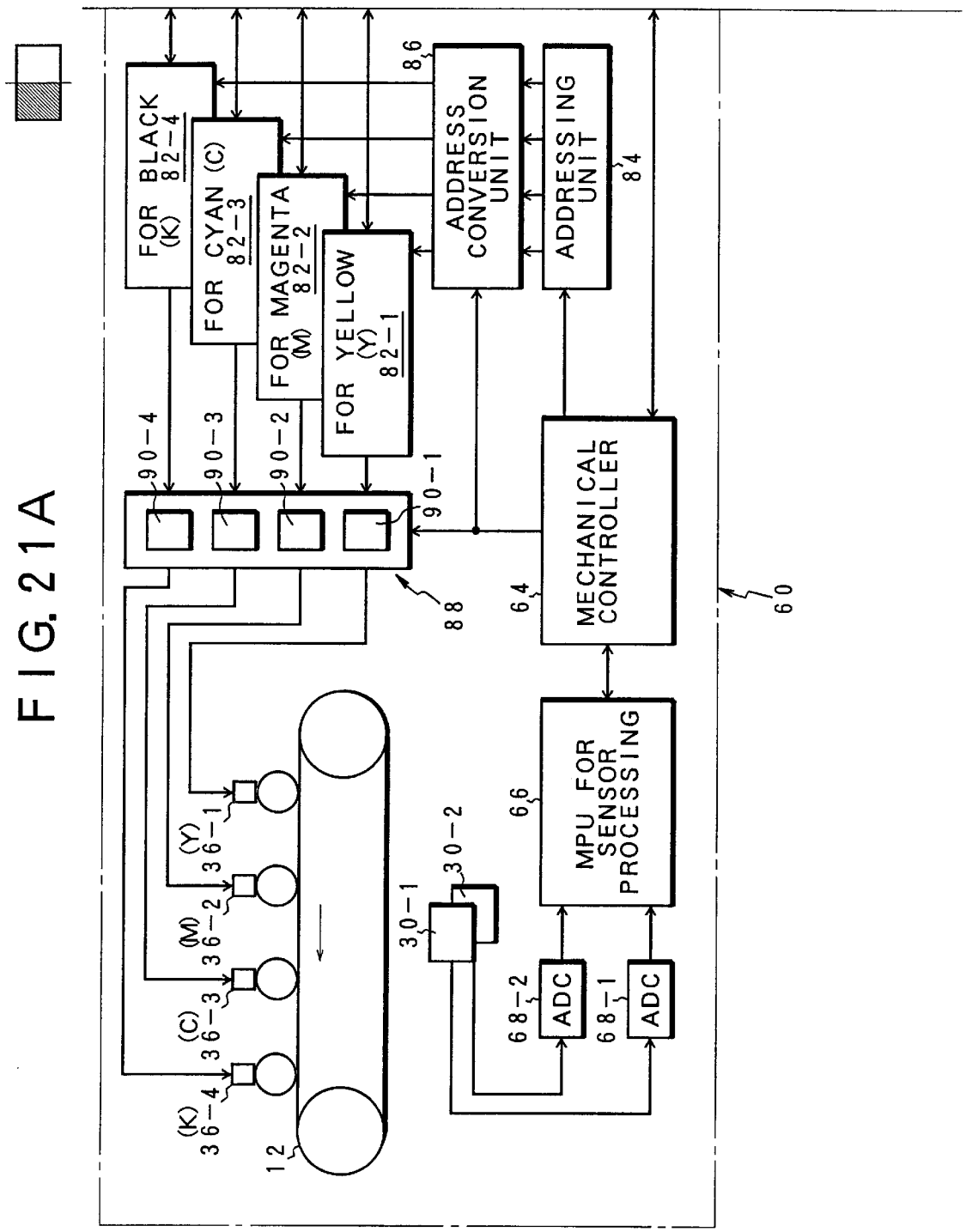

FIGS. 21A and 21B show a third embodiment of the hardware configuration of the present invention. In the third embodiment, the image memories 82-1 to 82-4 and the resolution converting unit 88 provided in the controller 62 in the first and second embedments are provided in the engine 60. Correspondingly, the controller 62 is provided with an image processing unit 150 and the engine 60 is provided with an image deploying unit 160. The image processing unit 150 and the image deploying unit 160 share the function of the MPU 72 for controller in the first and second embodiments. In the third embodiment of FIGS. 21A and 21B, the quantity-of-light control unit 100 shown in FIG. 9 is provided in the image processing unit 150 of the controller 62.

Figure 22A:
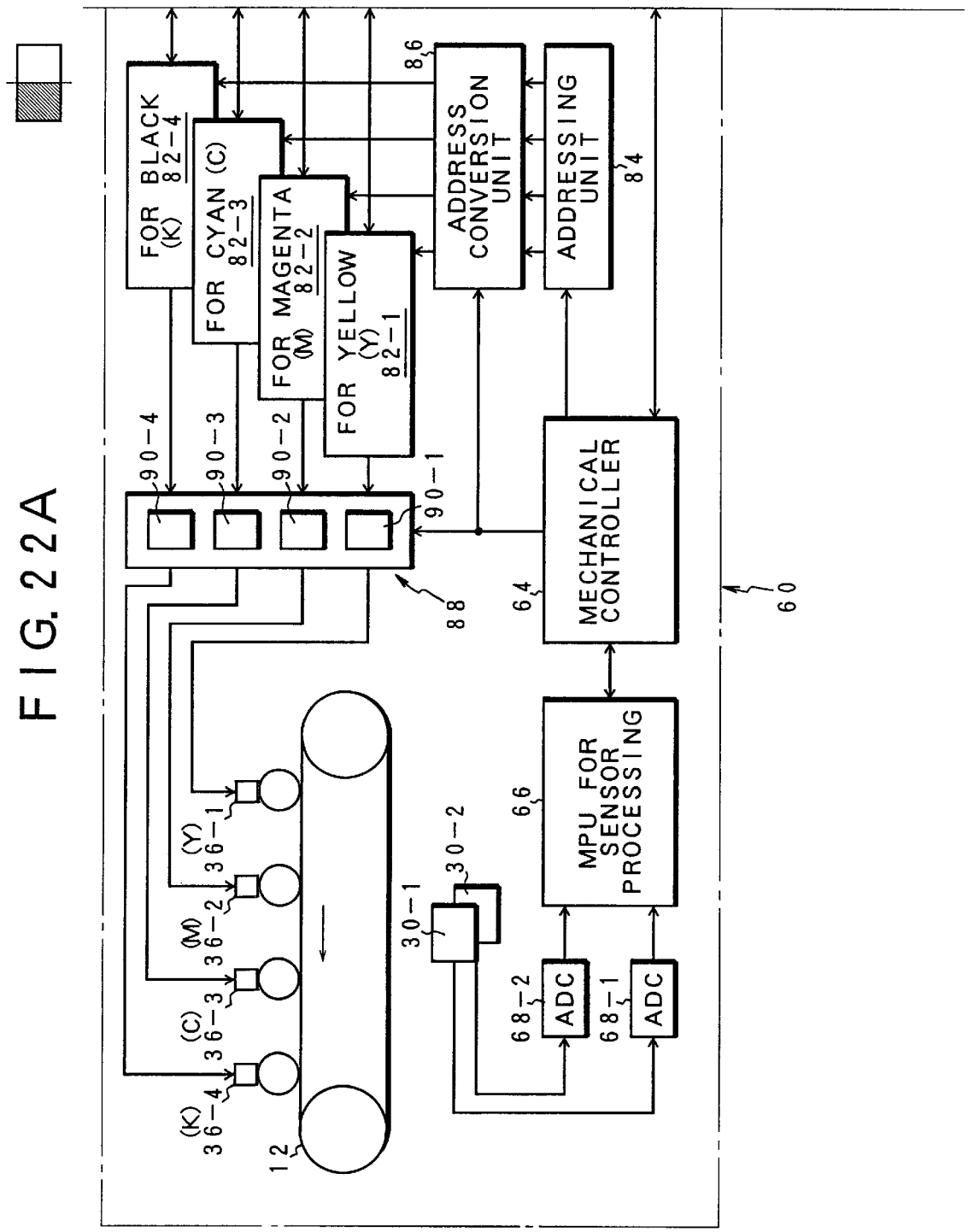
FIGS. 22A and 22B are block diagrams of a hardware configuration in accordance with a fourth embodiment of the present invention.
Figure 22B:
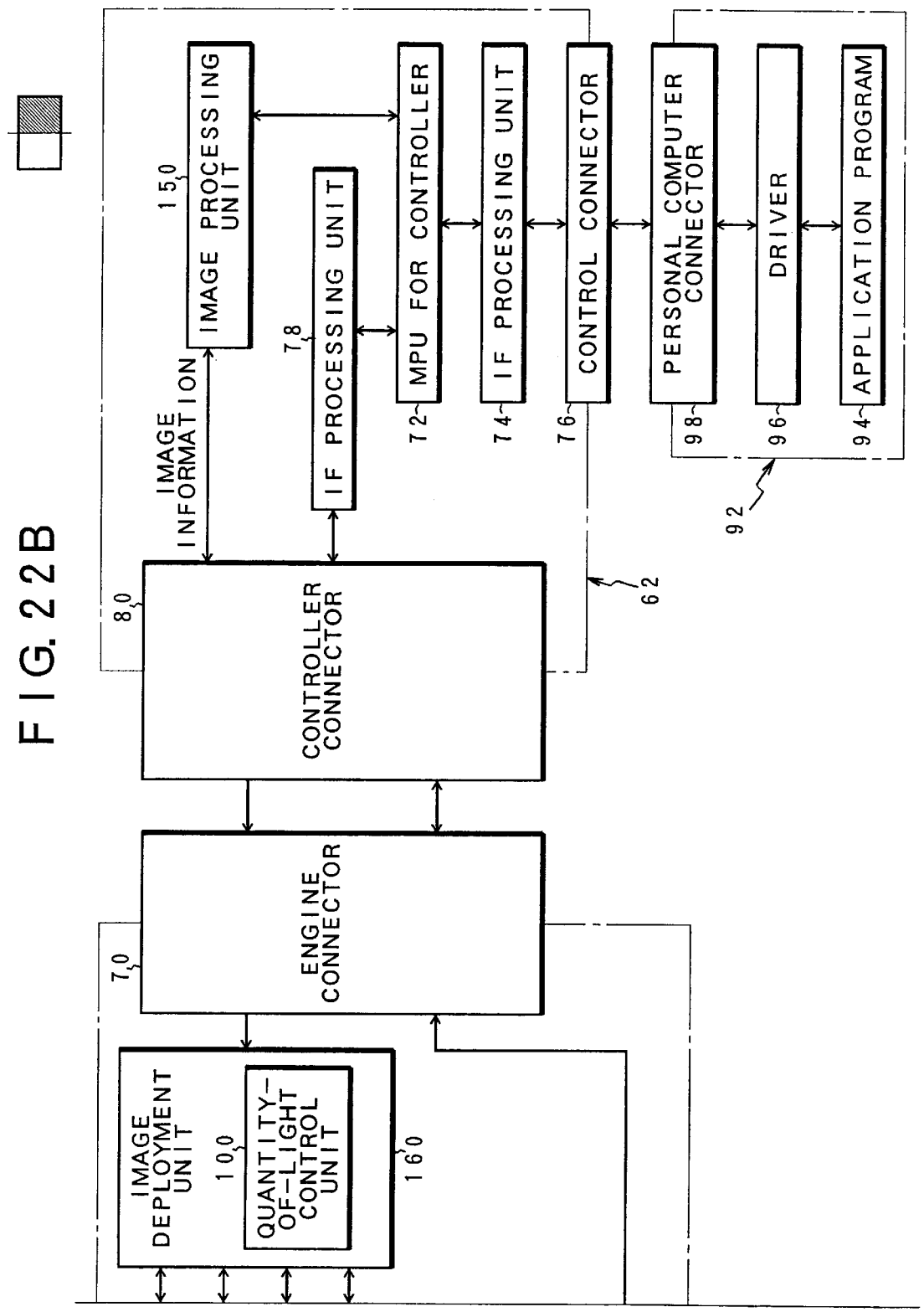

FIGS. 22A and 22B show a fourth embodiment of the hardware configuration of the present invention, which is characterized in that in the same controller 62 and engine 60 as in the third embodiment hardware configuration of FIGS. 21A and 21B, the quantity-of-light control unit 100 of FIG. 9 is provided in the image deploying unit 160 of the engine 60.

According to the present invention as set forth hereinabove, the non-linearity upon the conversion of optical energy into dot diameters in the electrophotographic process is interpolated so that print dots faithful to image dot data can be reproduced. Further, there is no need for a technique using a multiplicity of patterns such as edge recognition for smoothing processing and the like which has hitherto been performed for binarized dot patterns, so that letters, diagrams, images and their mixtures can faithfully be reproduced by means of simplified processing.

Although in the above embodiments description has been made, by way of example, of the color printer having the electrostatic recording units 24-1 to 24-4 of yellow, magenta, cyan and black which are arranged along the conveyance belt in a tandem manner, the present invention is not limited to this, but is applicable intactly to an appropriate printer irrespective of whether it is a color printer or a black-and-white printer as long as the printer uses the electrostatic recording units employing electrophotographic process.

Although the above embodiments have been related to the printer by way of example, the present invention is applicable intactly to other electrophotographic apparatuses such as facsimiles which record images on appropriate sheet media.

What is claimed is:

1. An electrophotographic apparatus comprising:

an electrostatic recording unit which forms a dot latent image in conformity with binarized image dot data through lighting of a scanning light on a latent image carrier in motion and which, after development with a toner component, transfers dots onto record paper; and a quantity-of-light control unit which, for each lighting noticeable dot among said image dot data, provides a control of an amount of optical energy for use in formation of a latent image of said noticeable dot such that said noticeable dot can have a certain dot diameter on said record paper, on the basis of peripheral dots which may have influence on a size of said noticeable dot on said record paper, wherein said quantity-of-light control unit defines, as a reference value of optical energy of said noticeable dot, optical energy required for formation of a solid part of an image on said record paper on which all dots are transferred, and wherein said quantity-of-light control unit, when peripheral dots are turned off, controls the optical energy to be equal to a value obtained by adding to said reference value a quantity-of-light optical energy which has been compensated for by light-emission of said peripheral dots, and wherein said quantity-of-light control unit provides a control of optical energy of said noticeable dot in response to a distance from said peripheral dots.

2. An electrophotographic apparatus comprising:

an electrostatic recording unit which forms a dot latent image in conformity with binarized image dot data through lighting of a scanning light on a latent image carrier in motion and which, after development with a toner component, transfers dots onto record paper; and a quantity-of-light control unit which, for each lighting noticeable dot among said image dot data, provides a control of an amount of optical energy for use in formation of a latent image of said noticeable dot such that said noticeable dot can have a certain dot diameter on said record paper, on the basis of peripheral dots which may have influence on a size of said noticeable dot on said record paper, wherein said quantity-of-light control unit defines, as a reference value of optical energy of said noticeable dot, optical energy required for formation of an isolated dot, and wherein said quantity-of-light control unit, when said peripheral dots are turned on, controls the optical energy to be equal to a value obtained by subtracting from said reference value a quantity of optical energy which has been compensated for by light-emission of said peripheral dots, and wherein said quantity-of-light control unit provides a control of optical energy of said noticeable dot in response to a distance from said peripheral dots.

3. An apparatus according to claim 1 or claim 2, wherein said quantity-of-light control unit, when said value of optical energy for controlling said noticeable dot exceeds a maximum value capable of being controlled per dot by said electrostatic recording unit, controls the optical energy so as to allocate a quantity of optical energy exceeding said maximum value to adjoining dots.

4. An apparatus according to claim 1 or claim 2, wherein said quantity-of-light control unit, when a value of optical energy for controlling said noticeable dot exceeds a maximum value capable of being controlled per dot by said electrostatic recording unit, provides output of optical energy discretely through a plurality of scanning operations.

5. An apparatus according to claim 1 or claim 2, wherein said quantity-of-light control unit controls the optical energy so that said noticeable dot forms one isolated dot.

6. An apparatus according to claim 1 or claim 2, wherein said quantity-of-light control unit controls the optical energy of said noticeable dot so that a density is not saturated with a high-density region.

7. An apparatus according to claim 1 or claim 2, wherein said quantity-of-light control unit, when using an LED array, controls the optical energy of lighting dots by strobe time of a pulse train issued from LED elements.

8. An apparatus according to claim 1 or claim 2, wherein said quantity-of-light control unit, when using an LED array, controls the optical energy of lighting dots by a quantity of light-emission per unit time of LED elements.

9. An apparatus according to claim 1 or claim 2, wherein said quantity-of-light control unit, when a laser beam is scanned for development, controls the optical energy of lighting dots by a pulse width per dot.

10. An apparatus according to claim 1 or claim 2, wherein said quantity-of-light control unit includes a gradation data conversion means using a stored conversion characteristic table for converting, when an LED array is used and when control is provided by converting the optical energy of light dots into gradation values, the optical energy into gradation values in such a manner that said gradation values have no equi-intervals.

11. An apparatus according to claim 10, wherein said quantity-of-light control unit, when said gradation values are controlled by strobe time of a pulse train issued from LED elements, performs the conversion of the optical energy into gradation values in such a manner that the pulse widths of said pulse train have no equi-intervals.

12. An apparatus according to claim 10, wherein said quantity-of-light control unit, when said gradation values are controlled by a amount of light-emission of LED elements, performs the conversion in such a manner that a drive current of said LED elements which is obtained by converting said gradation values has no equi-interval increments.

13. An apparatus according to claim 1 or claim 2, wherein said quantity-of-light control unit, when a size of exposed dots in an exposure system is smaller than a size of developed dots formed on said record paper by said electrostatic recording unit, controls the optical energy of lighting dots by a number of exposed dots lighting in developed dots.

* * * * *